(12) United States Patent
McLaughlin et al.

(10) Patent No.: US 9,715,694 B2
(45) Date of Patent: Jul. 25, 2017

(54) SYSTEM AND METHOD FOR WEBSITE PERSONALIZATION FROM SURVEY DATA

(71) Applicant: Go Daddy Operating Company, LLC, Scottsdale, AZ (US)

(72) Inventors: Michael McLaughlin, Menlo Park, CA (US); Tapan Kamdar, San Jose, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 122 days.

(21) Appl. No.: 14/180,215

(22) Filed: Feb. 13, 2014

(65) Prior Publication Data
US 2015/0106687 A1 Apr. 16, 2015

Related U.S. Application Data

(63) Continuation-in-part of application No. 14/051,358, filed on Oct. 10, 2013.

(51) Int. Cl.
G06F 17/22 (2006.01)
G06Q 30/02 (2012.01)

(52) U.S. Cl.
CPC .................... G06Q 30/02 (2013.01)

(58) Field of Classification Search
CPC ............... H04L 29/12632; G06F 21/78; G06F 17/30867; G06Q 30/00
See application file for complete search history.

(56) References Cited

U.S. PATENT DOCUMENTS

| | | | |
|---|---|---|---|
| 5,187,797 A * | 2/1993 | Nielsen ................ | H02J 7/35 700/17 |
| 6,338,082 B1 | 1/2002 | Schneider | |
| 6,446,133 B1 | 9/2002 | Tan et al. | |
| 6,480,508 B1 | 11/2002 | Mwikalo et al. | |
| 6,687,746 B1 | 2/2004 | Shuster et al. | |
| 6,745,248 B1 | 6/2004 | Gardos et al. | |
| 6,760,746 B1 | 7/2004 | Schneider | |
| 6,876,997 B1 | 4/2005 | Rorex et al. | |
| 6,901,436 B1 | 5/2005 | Schneider | |

(Continued)

FOREIGN PATENT DOCUMENTS

| | | | | |
|---|---|---|---|---|
| GB | EP 1686513 A2 * | 8/2006 | ............... | G06N 5/04 |
| JP | 2001167017 | 6/2001 | | |

(Continued)

Primary Examiner — Scott Baderman
Assistant Examiner — Mario M Velez-Lopez
(74) Attorney, Agent, or Firm — Quarles & Brady LLP

(57) ABSTRACT

A system and method for the generation of candidate domain names and potential website content are presented. The method includes receiving, by at least one server communicatively coupled to a network, a request to access or purchase access to a software application, the request being received from a user. Keywords associated with at least one of the user, a website of the user, and a business of the user may be generated and a candidate domain name relevant to the keywords may be generated. A drill-down survey may be presented to collect information from the user that the user thinks is relevant to the generation of a candidate domain name or potential website content. The survey responses are aggregated and then analyzed to generate one or more candidate domain names and/or to suggest potential website content.

18 Claims, 19 Drawing Sheets

(56) References Cited

U.S. PATENT DOCUMENTS

| | | |
|---|---|---|
| 6,973,505 B1 | 12/2005 | Schneider |
| 6,976,090 B2 | 12/2005 | Ben-Shaul et al. |
| 6,980,990 B2 | 12/2005 | Fellman |
| 7,000,028 B1 | 2/2006 | Broadhurst et al. |
| 7,039,697 B2 | 5/2006 | Bayles |
| 7,099,956 B2 | 8/2006 | Shuster et al. |
| 7,136,932 B1 | 11/2006 | Schneider |
| 7,188,138 B1 | 3/2007 | Schneider |
| 7,194,552 B1 | 3/2007 | Schneider |
| 7,233,908 B1* | 6/2007 | Nelson ............ G06Q 10/06375 705/7.32 |
| 7,238,661 B2 | 7/2007 | Glynn et al. |
| 7,287,002 B1 | 10/2007 | Asher et al. |
| 7,289,971 B1 | 10/2007 | O'Neil et al. |
| 7,296,026 B2 | 11/2007 | Patrick et al. |
| 7,299,299 B2 | 11/2007 | Hollenbeck et al. |
| 7,299,491 B2 | 11/2007 | Shelest et al. |
| 7,305,394 B2 | 12/2007 | Fellman |
| 7,319,992 B2 | 1/2008 | Gaos |
| 7,343,328 B1* | 3/2008 | Smith ............... G06Q 30/0603 705/26.41 |
| 7,346,899 B2 | 3/2008 | Ebro et al. |
| 7,386,438 B1 | 6/2008 | Franz et al. |
| 7,400,981 B1 | 7/2008 | Rigney |
| 7,418,471 B2 | 8/2008 | King et al. |
| 7,493,403 B2 | 2/2009 | Shull et al. |
| 7,542,969 B1 | 6/2009 | Rappaport et al. |
| 7,565,630 B1 | 7/2009 | Kamvar et al. |
| 7,606,858 B2 | 10/2009 | King et al. |
| 7,627,628 B2 | 12/2009 | King et al. |
| 7,664,831 B2 | 2/2010 | Cartmell et al. |
| 7,668,119 B2 | 2/2010 | Thubert et al. |
| 7,680,819 B1 | 3/2010 | Mellmer et al. |
| 7,689,458 B2 | 3/2010 | Heckerman et al. |
| 7,698,425 B2 | 4/2010 | Thayer et al. |
| 7,698,426 B2 | 4/2010 | Thayer et al. |
| 7,702,902 B2 | 4/2010 | Thayer et al. |
| 7,711,850 B2 | 5/2010 | Ronen et al. |
| 7,711,851 B2 | 5/2010 | Ronen et al. |
| 7,734,745 B2 | 6/2010 | Gloe |
| 7,761,565 B2 | 7/2010 | Adelman et al. |
| 7,761,566 B2 | 7/2010 | Adelman et al. |
| 7,805,426 B2 | 9/2010 | Leung et al. |
| 7,822,868 B2 | 10/2010 | Gassewitz et al. |
| 7,877,432 B2 | 1/2011 | Maxson et al. |
| 7,890,602 B1 | 2/2011 | Parsons et al. |
| 7,921,035 B2 | 4/2011 | Adelman |
| 7,953,812 B2 | 5/2011 | Ruiz |
| 7,953,813 B2 | 5/2011 | Ruiz |
| 7,962,438 B2 | 6/2011 | Adelman et al. |
| 7,991,764 B2 | 8/2011 | Rathod |
| 8,015,006 B2 | 9/2011 | Kennewick et al. |
| 8,037,168 B2 | 10/2011 | Schneider |
| 8,069,187 B2 | 11/2011 | Adelman et al. |
| 8,117,339 B2 | 2/2012 | Adelman et al. |
| 8,156,180 B2 | 4/2012 | Adelman |
| 8,171,070 B2 | 5/2012 | Zimmerman et al. |
| 8,171,110 B1 | 5/2012 | Parsons et al. |
| 8,195,652 B1 | 6/2012 | Parsons et al. |
| 8,209,379 B2 | 6/2012 | Adelman |
| 8,234,351 B2 | 7/2012 | Curran et al. |
| 8,276,057 B2 | 9/2012 | Rowe et al. |
| 8,280,952 B1 | 10/2012 | Parsons et al. |
| 8,301,743 B2 | 10/2012 | Curran et al. |
| 8,370,217 B1 | 2/2013 | Parsons et al. |
| 8,380,800 B2 | 2/2013 | Ruiz |
| 8,438,029 B1* | 5/2013 | Stuttle .................. G10L 13/08 704/220 |
| 8,489,746 B2 | 7/2013 | Nicks et al. |
| 8,515,969 B2 | 8/2013 | Nicks et al. |
| 2001/0039543 A1 | 11/2001 | Mann et al. |
| 2002/0040301 A1 | 4/2002 | Royall et al. |
| 2002/0061021 A1 | 5/2002 | Dillon |
| 2002/0065903 A1 | 5/2002 | Fellman |
| 2002/0091703 A1 | 7/2002 | Bayles |
| 2002/0091827 A1 | 7/2002 | King et al. |
| 2002/0120491 A1* | 8/2002 | Nelson ................. G06Q 30/02 705/7.32 |
| 2002/0120537 A1 | 8/2002 | Morea et al. |
| 2002/0138291 A1 | 9/2002 | Vaidyanathan et al. |
| 2002/0152206 A1 | 10/2002 | Gusler et al. |
| 2002/0173981 A1 | 11/2002 | Stewart |
| 2002/0184172 A1 | 12/2002 | Shlain et al. |
| 2003/0037131 A1 | 2/2003 | Verma |
| 2003/0065778 A1* | 4/2003 | Malik ................. G06Q 10/107 709/225 |
| 2003/0105868 A1 | 6/2003 | Kimbrel et al. |
| 2003/0115333 A1 | 6/2003 | Cohen et al. |
| 2003/0120649 A1 | 6/2003 | Uchino et al. |
| 2003/0132967 A1 | 7/2003 | Gangadharan |
| 2003/0177274 A1 | 9/2003 | Sun |
| 2003/0182365 A1 | 9/2003 | Toda et al. |
| 2003/0182573 A1 | 9/2003 | Toneguzzo et al. |
| 2004/0068436 A1 | 4/2004 | Boubek et al. |
| 2004/0093257 A1* | 5/2004 | Rogers .................. G06Q 30/02 705/7.32 |
| 2004/0093331 A1 | 5/2004 | Garner et al. |
| 2004/0098375 A1 | 5/2004 | DeCarlo |
| 2004/0133644 A1 | 7/2004 | Warren et al. |
| 2004/0148229 A1 | 7/2004 | Maxwell |
| 2004/0148483 A1 | 7/2004 | Bookstaff et al. |
| 2004/0162916 A1 | 8/2004 | Ryan |
| 2004/0167982 A1 | 8/2004 | Cohen et al. |
| 2004/0172463 A1 | 9/2004 | King et al. |
| 2004/0181430 A1 | 9/2004 | Fotsch et al. |
| 2004/0199493 A1 | 10/2004 | Ruiz et al. |
| 2004/0199608 A1 | 10/2004 | Rechterman et al. |
| 2004/0250109 A1 | 12/2004 | Draughon et al. |
| 2005/0021588 A1 | 1/2005 | Zimmerman et al. |
| 2005/0080786 A1 | 4/2005 | Fish et al. |
| 2005/0114484 A1 | 5/2005 | Wilson et al. |
| 2005/0125451 A1 | 6/2005 | Mooney |
| 2005/0144520 A1 | 6/2005 | Tuma et al. |
| 2005/0198095 A1 | 9/2005 | Du et al. |
| 2005/0203891 A1 | 9/2005 | Broadhurst et al. |
| 2005/0216288 A1 | 9/2005 | Parsons |
| 2005/0216290 A1 | 9/2005 | Sachs et al. |
| 2005/0234363 A1 | 10/2005 | Xue |
| 2005/0234921 A1 | 10/2005 | King et al. |
| 2005/0256853 A1 | 11/2005 | Fellman |
| 2005/0268237 A1 | 12/2005 | Crane et al. |
| 2005/0289242 A1 | 12/2005 | Ruiz |
| 2006/0004784 A1 | 1/2006 | Ableman et al. |
| 2006/0020667 A1 | 1/2006 | Wang et al. |
| 2006/0031315 A1 | 2/2006 | Fenton et al. |
| 2006/0031330 A1 | 2/2006 | Ruiz |
| 2006/0101005 A1 | 5/2006 | Yang et al. |
| 2006/0101155 A1 | 5/2006 | Damour et al. |
| 2006/0106793 A1 | 5/2006 | Liang |
| 2006/0122889 A1 | 6/2006 | Burdick et al. |
| 2006/0136908 A1 | 6/2006 | Gebhart et al. |
| 2006/0155656 A1 | 7/2006 | Kreder et al. |
| 2006/0157560 A1 | 7/2006 | Skor et al. |
| 2006/0161681 A1 | 7/2006 | King et al. |
| 2006/0161682 A1 | 7/2006 | King et al. |
| 2006/0168020 A1 | 7/2006 | Brennan |
| 2006/0171523 A1 | 8/2006 | Greenwell |
| 2006/0184620 A1 | 8/2006 | Melet et al. |
| 2006/0212931 A1 | 9/2006 | Shull et al. |
| 2006/0230380 A1 | 10/2006 | Holmes et al. |
| 2006/0271668 A1 | 11/2006 | Parsons et al. |
| 2006/0287936 A1 | 12/2006 | Jacobson |
| 2007/0016577 A1 | 1/2007 | Lasa et al. |
| 2007/0061336 A1 | 3/2007 | Ramer et al. |
| 2007/0067465 A1 | 3/2007 | Blinn et al. |
| 2007/0083423 A1 | 4/2007 | Delbridge |
| 2007/0094365 A1 | 4/2007 | Nussey et al. |
| 2007/0094606 A1* | 4/2007 | Kirkpatrick ............ G06Q 30/02 715/760 |
| 2007/0174255 A1 | 7/2007 | Sravanapudi et al. |
| 2007/0174630 A1 | 7/2007 | Shannon et al. |
| 2007/0180056 A1 | 8/2007 | Assad |
| 2007/0208740 A1 | 9/2007 | Nye |
| 2007/0208869 A1 | 9/2007 | Adelman et al. |

(56) References Cited

U.S. PATENT DOCUMENTS

| | | |
|---|---|---|
| 2007/0271393 A1 | 11/2007 | Wong |
| 2007/0287473 A1 | 12/2007 | Dupray |
| 2007/0294431 A1 | 12/2007 | Adelman et al. |
| 2007/0299815 A1 | 12/2007 | Starbuck et al. |
| 2008/0005127 A1 | 1/2008 | Schneider |
| 2008/0034211 A1 | 2/2008 | Shull et al. |
| 2008/0040329 A1 | 2/2008 | Cussen et al. |
| 2008/0071909 A1 | 3/2008 | Young et al. |
| 2008/0114869 A1* | 5/2008 | Thayer .................... H04L 67/02 709/223 |
| 2008/0198162 A1 | 8/2008 | Ni |
| 2008/0201258 A1 | 8/2008 | D'Ambrosio |
| 2008/0263145 A1* | 10/2008 | Jebson .................. G06Q 10/04 709/203 |
| 2008/0270486 A1 | 10/2008 | Hind et al. |
| 2008/0319950 A1* | 12/2008 | Lasa ................. G06F 17/30899 |
| 2009/0006351 A1 | 1/2009 | Stephenson et al. |
| 2009/0094137 A1 | 4/2009 | Toppenberg et al. |
| 2009/0119198 A1 | 5/2009 | Manriquez et al. |
| 2009/0125308 A1 | 5/2009 | Ambler |
| 2009/0133580 A1 | 5/2009 | Geurtz |
| 2009/0164598 A1 | 6/2009 | Nelson et al. |
| 2009/0182884 A1 | 7/2009 | Datta et al. |
| 2009/0216577 A1 | 8/2009 | Killebrew |
| 2009/0222368 A1 | 9/2009 | McCauley et al. |
| 2009/0248625 A1 | 10/2009 | Adelman et al. |
| 2009/0248734 A1 | 10/2009 | Adelman et al. |
| 2009/0248735 A1 | 10/2009 | Adelman et al. |
| 2009/0248736 A1 | 10/2009 | Adelman et al. |
| 2009/0254545 A1 | 10/2009 | Fisken |
| 2009/0292696 A1 | 11/2009 | Shuster |
| 2009/0307256 A1 | 12/2009 | Tiyyagura |
| 2010/0042688 A1 | 2/2010 | Maghraby |
| 2010/0058210 A1 | 3/2010 | Johnson |
| 2010/0114879 A1 | 5/2010 | Zhong et al. |
| 2010/0145678 A1 | 6/2010 | Csomai et al. |
| 2010/0146001 A1 | 6/2010 | Lee |
| 2010/0146119 A1 | 6/2010 | Lee |
| 2010/0169492 A1 | 7/2010 | Lee |
| 2010/0223143 A1 | 9/2010 | Lee |
| 2010/0274668 A1 | 10/2010 | Langston et al. |
| 2011/0016022 A1 | 1/2011 | Essawi et al. |
| 2011/0087769 A1 | 4/2011 | Holmes et al. |
| 2011/0276513 A1* | 11/2011 | Erhart ............... G06F 17/30539 705/347 |
| 2011/0282988 A1 | 11/2011 | Wang et al. |
| 2012/0047577 A1 | 2/2012 | Costinsky |
| 2012/0072407 A1 | 3/2012 | Shyamsunder et al. |
| 2012/0096019 A1* | 4/2012 | Manickam ........ H04L 29/12632 707/767 |
| 2012/0173397 A1* | 7/2012 | Elwell .................. G06F 21/335 705/35 |
| 2013/0181828 A1* | 7/2013 | Lukose ................ G06Q 10/109 340/501 |
| 2014/0052645 A1* | 2/2014 | Hawes .................. G06Q 10/20 705/304 |
| 2015/0113448 A1* | 4/2015 | Underwood ........ G06F 17/3089 715/760 |

FOREIGN PATENT DOCUMENTS

| | | |
|---|---|---|
| JP | 2002297938 | 10/2002 |
| WO | 9909726 | 2/1999 |

* cited by examiner

SYSTEM AND METHOD FOR WEBSITE PERSONALIZATION FROM SURVEY DATA

CROSS-REFERENCE TO RELATED APPLICATIONS

This application is a continuation-in-part and claims the benefit of U.S. patent application Ser. No. 14/051,358, filed Oct. 10, 2013, and incorporated herein by reference.

FIELD OF THE INVENTION

The present invention relates generally to the generation of website information and, more particularly, to systems and methods for providing potential personalized website information to a user based on responses to a survey.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as web pages. Websites comprise a collection of connected, or otherwise related, web pages. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites may consist of a single webpage, but typically consist of multiple interconnected and related web pages. Websites, unless extremely large and complex or exposed to unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, the browser requests and receives information from the webpage, typically in the form of an HTML document, and then displays the webpage content for the user. The user then may view other web pages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

For many users that wish to have an Internet presence, the selection of a particular domain name may be secondary consideration. Some users, for example, may desire to construct a website and may even have a vague understanding of the concept of a domain name, but may not understand that a domain name must be registered before the website can be hosted there. Other users may have already registered a domain name, but may not understand that a domain name must, in many cases, be selected in order optimize the search engine performance of the domain name and associated website. For example, a customer may wish to purchase advertising services for a website at a particular domain name, but may not understand that the domain name is a poor match for the desired advertising. In such a case, the user may observe better performance for the advertising if the user were to register a new, better suited, domain name and host the website on that domain name.

Similarly, users that are not expertly familiar with website design strategies may be unaware that certain website content may be well-suited to attract visitors to the user's website. For example, small business websites in a particular vertical market, such as restaurants, may very frequently include HTML-based price lists (such as menus), hours of operation, customer reviews, and the like. The user's website may provide a better experience for visitors if such commonly used features, which may be expected by visitors, are included on the website.

BRIEF DESCRIPTION OF THE DRAWINGS

FIG. 8B is a screenshot showing an example form the requester can complete to provide input data while using a website builder application.

FIG. 10 is a screenshot showing an example website information page by which the requester can complete a website information form to provide input data while using an advertising software application provided by the registrar.

DETAILED DESCRIPTION

Figure 1:
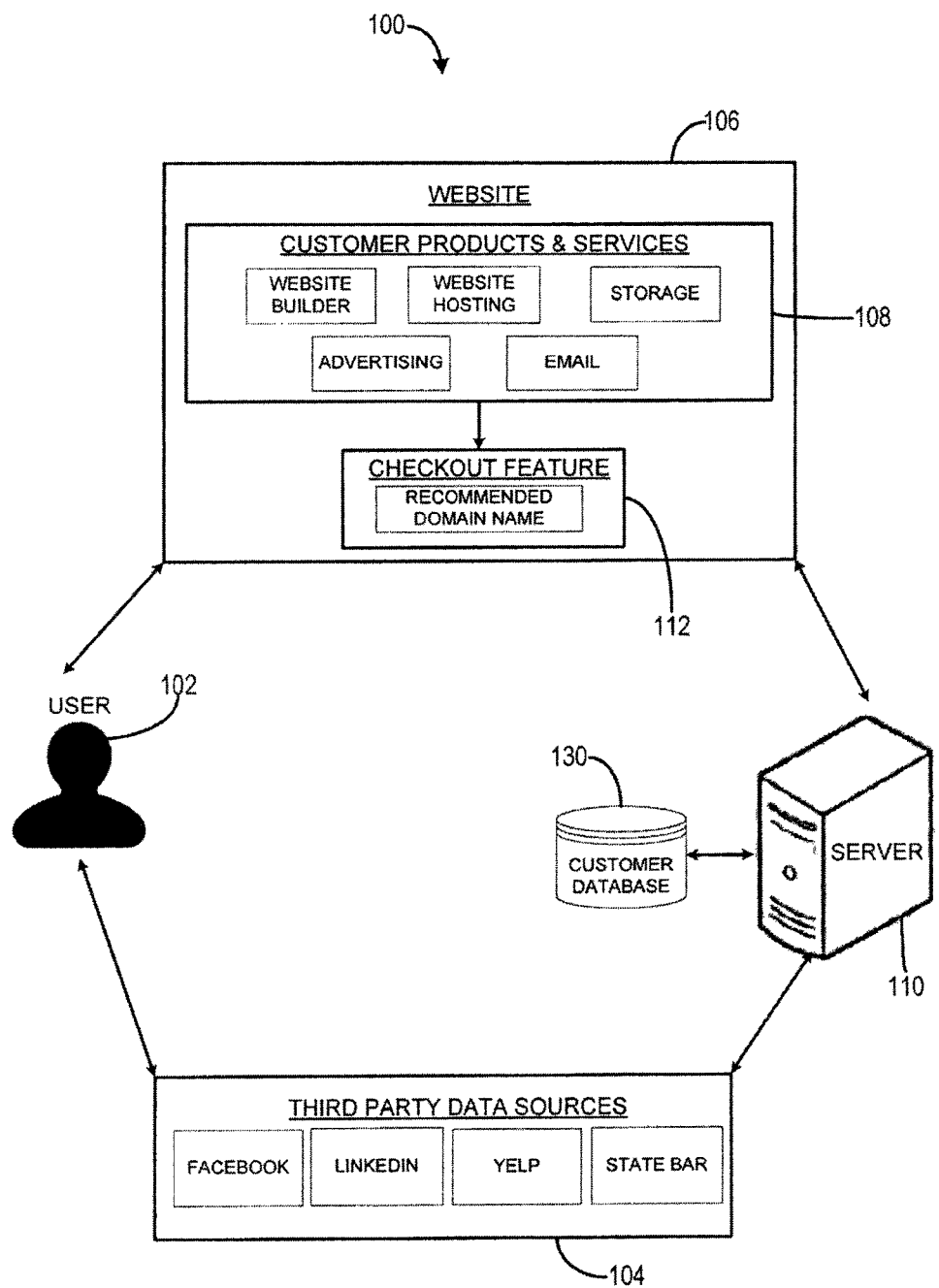
FIG. 1 illustrates a possible embodiment of a system for generating a candidate domain name.

The present invention relates generally to the generation of candidate domain names and potential website content and, more particularly, to systems and methods for providing users one or more candidate domain names and/or potential website content based on information accumulated while a user processes a transaction and/or user responses to a drill-down survey.

In one implementation, the present disclosure provides a method that includes presenting a drill-down survey comprising one or more questions to a user, parsing the user's responses into keywords, generating a candidate domain name relevant to the keywords, and displaying to the user a user interface that includes the candidate domain name and enables the user to register the candidate domain name. The keywords may be associated with at least one of the user, a website of the user, and a business of the user. Parsing the responses may include acquiring data from a third party data source. The user interface may be displayed within a software application, which may be a website builder application, a website hosting application, an advertising application, a storage application, or an email application.

Each of the questions may correspond to a node in a tree structure. The tree structure may have parent nodes and child nodes of the parent nodes. Each question corresponding to one of the child nodes may be more specific than the question corresponding to each of that child node's parent nodes. One or more of the questions may be an open-ended question, and presenting the drill-down survey may include displaying either a text box or a text area in which the user enters the response to the open-ended question. One or more of the questions may have a plurality of pre-formatted responses.

The method may further include generating a suggestion for potential website content to be included on a website of the user, the potential website content being relevant to the keywords. The method may further include displaying the suggestion in the user interface. The method may further include generating one or more of the questions for the survey from a corpus of information. The corpus of information may include data obtained from a source of publicly available data.

In another implementation, the present disclosure provides a method that includes presenting a drill-down survey comprising one or more questions to a user, parsing the user's responses into keywords, generating a suggestion for potential website content to be included on a website of the user, the potential website content being relevant to the keywords, and displaying to the user a user interface that includes the suggestion and enables the user to select the potential website content for inclusion in the website. The keywords may be associated with at least one of the user, a website of the user, and a business of the user. The questions may be arranged into one or more tree structures and each of the questions may correspond to a node in one of the tree structures. Each of the one or more tree structures may include parent nodes and child nodes of the parent nodes, and each question corresponding to one of the child nodes may be more specific than the question corresponding to each of that child node's parent nodes. The questions may be generated from a corpus of information.

In another implementation, the present disclosure provides a system that includes at least one server computer in communication with a network. The server computer includes a processor configured to present, to a user of the network, a drill-down survey comprising one or more questions, to parse the user's responses to the questions into keywords, and to generate at least one of a candidate domain name relevant to the keywords and a suggestion for potential website content relevant to the keywords. The keywords may be associated with at least one of the user, a website of the user, and a business of the user. The processor may be further configured to access a data source on behalf of the user. One of the questions may include a request for the user to authorize the processor to access the data source. The system may further include a database storing a corpus of information, and the processor may be further configured to access the database and generate one or more of the questions from the corpus of information. The system may further include a database storing the questions in one or more tree structures, each of the questions corresponding to a node in one of the tree structures.

A user operating hosted software applications (e.g., website builders, email, website hosting, storage, auctions, advertising, etc.) or browsing for and purchasing the same often provides a large amount of information, either personal or business related, to the host of those applications, such as a registrar. Many users, however, may not understand or want to take the steps necessary to search for and register a domain name while utilizing the client software applications or browsing for and purchasing the same. Therefore, the present system can monitor the user's activities and provide the user with a listing of relevant candidate domain names, as an automated process, based on the information provided by the user during interaction with the client software applications. If the user, upon reviewing one or more of the provided candidate domain names, wishes to register one of the candidate domain names, the user can select the desired domain name and undertake a registration procedure.

Many users may also lack the ability or desire to create website content for the website to be hosted at the chosen domain name. Therefore, the present system can, as an automated process, perform related processing of the monitored activities and user-provided information and provide the user with suggestions of potential website content.

The present system can provide the user with interactive control over the specificity of the information, and therefore the level of detail, that is included in the processes of generating candidate domain names and potential website content. The interactive control may be a drill-down survey containing questions arranged in a tree structure, where the user's answers to the questions may promote more specific follow-on questions regarding the same subject matter. The user may determine the level of drill-down, at which point the system uses information collected from the user's answers to more particularly define the list of candidate domain names or suggested potential website content.

FIG. 1 is a system 100 for generating one or more candidate domain names for a user 102 accessing a website 106. The website 106 may, for example, include a website or web service hosted by a registrar or other entity. The website 106 may provide one or more software applications 108 (e.g., website builders, email, website hosting, storage, auctions, advertising, etc.) for purchase or with which the user 102 can interact. As the user 102 interacts with the plurality of client software applications 108, the user 102 provides input data (e.g., personal information or business information) that can be stored in a customer database 130 hosted on a server 110 hosting the website 106. The server 110 hosting the website 106 can process the input data provided by the user 102 and analyze that input data to generate candidate domain names for purchase using a checkout feature 112. The website 106 can then provide those relevant candidate domain names to the user 102, for example, while the user 102 is purchasing or otherwise operating one of the plurality of client software applications 108 or is otherwise interacting with one or more software applications 108 hosted by server 110. Optionally, the server 110 may gather and process additional data and information about the user 102 from third party data sources 104 (e.g., FACEBOOK, LINKEDIN, YELP, TWITTER, State Bar, etc.) based on the input data provided by the user 102 in order to provide a more relevant candidate domain name to the user or the user's business.

In general, the present system allows for the monitoring of the actions of a user while that user interacts with a website. The interactions may involve the user shopping for (e.g., searching for information describing) and purchasing goods or services or utilizing one or more hosted software application provided by the website. As the user interacts with the website, the user is providing information to the website, either explicitly or implicitly. For example, the user may explicitly provide information during a user account creation process or product research and product purchase and checkout process. Similarly, the user may input information into one or more software applications, such as a website builder or advertising service. Alternatively, the user may implicitly provide information, such as the user's location, products that were searched for and reviewed by the user, but not purchased, and the like. As described below, this information can be collected and analyzed to generate a set of candidate domain names that may be displayed to the user for purchase, where the candidate domain names are relevant to the user, or, for example, the user's business.

Figure 2:
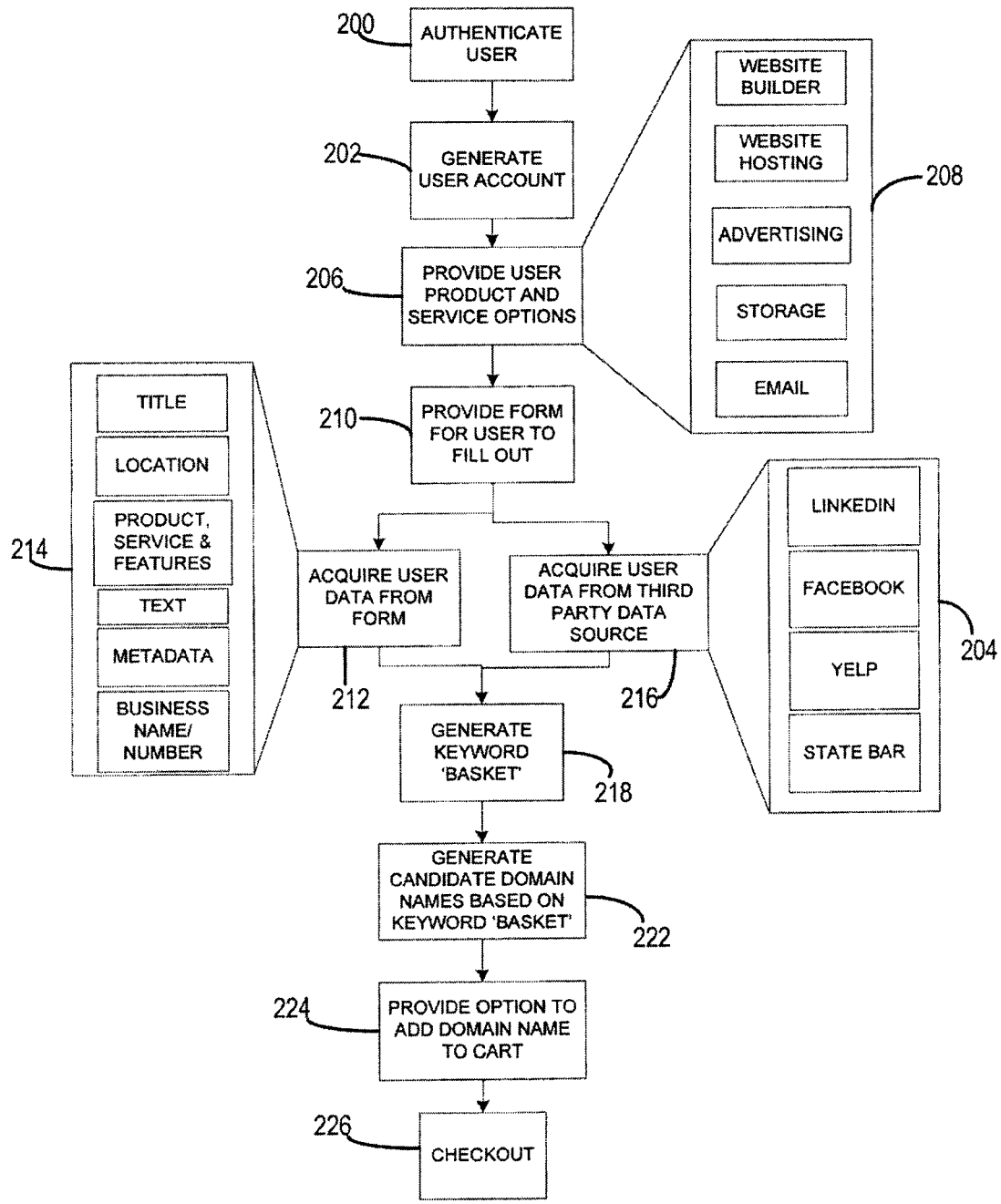
FIG. 2 is a flowchart illustrating a method for generating candidate domain names based on data received during purchase or use of a software application or service.

FIG. 2 is a flowchart illustrating a method by which candidate domain names can be generated for the user 102 based on data received from the user 102 during an acquisition of a software application or service. The method may be useful, for example, to assist users that are shopping for and purchasing Internet services that typically require the user to also have a domain name to select and register an appropriate domain name. A user, for example, may be shopping for hosting services, but not realize that the hosted content would typically be accessed through a domain name. In that case, the method illustrated in FIG. 2 may be utilized to provide the user with a listing of candidate domain names of which they may wish to purchase one in combination with their hosting services. In other cases, users may be browsing available services and not even realize that they would like to register a domain name. In that case, while the user browses the available services, they can also be provided with a listing of domain names that are relevant to them for selection and registration.

The user 102 begins by accessing the website 106. The user 102 may be any Internet user, for example, who may wish to establish an online presence and may subsequently access the website 106, such as GODADDY.COM's website, to purchase one or more online services. In step 200, the user 102 is authenticated as either an existing user or a new user. If the user 102 is an existing user, the website 106 provides the user 102 with product and service options for purchase at step 206 once the user 102 has logged in with their credentials (i.e., username and password). If the user 102 is a new user, a new user account may be generated at step 202. Once the user account is generated, the website 106 provides the user 102 with a listing of the plurality of client software applications 208 or services for purchase at step 206. In other implementations, the process may be reversed with the user first browsing available product and service options and, after selecting one or more for purchase, authenticating to the website 106 or creating a new user account. The plurality of client software applications 208 and services, as a non-limiting example, may include a website builder, website hosting services, search engine visibility (i.e., advertising) services, online storage and/or email applications.

At step 210, once the user has selected one of the software applications 208 or services for purchase, one or more order forms, as will be discussed in further detail below, is displayed to the user 102 on a user interface. The form may vary depending on which of the plurality of client software applications 208 the user 102 has requested. Generally, the form prompts the user 102 to provide any additional information, if necessary, for the requested services to be provided to the user 102. For example, the form may be a user information form, a business information form, a user contact information form, a website information form or order form requesting specific user 102 information and providing blanks for the user 102 to enter personal and/or business related data through the user interface. As the user 102 completes the form, the information provided by the user 102 is captured. For example, the form may request that the user 102 provide input data 214 that includes, but is not limited to, a title (e.g., a business name), a location (e.g., home and/or business address, city, state, zip code, etc.), a phone number, features relevant to the user's 102 products and services that may be offered by the user's business, email address, text, and metadata such as images provided by the user 102 to the website 106 at step 212. In some implementations, some or all of the data requested by the order form may be populated with information retrieved from the user's account information. In that case, a fellable order form may not be displayed for the user. Instead, the form may be automatically created and the user may simply be provided with a user interface allowing the user to confirm that they wish to purchase the selected software application.

As the user 102 is providing the input data 214, the system 100 may be configured to acquire additional data about the user 102 from third party data sources 204 at step 216. For example, if the user 102 provides their first and last name on the form (or that information can be retrieved from the user's account), the system 100 may run a search on the third party data sources 204 using the user's 102 first and last name to gather additional information about the user 102. The third party data sources 204 may include, but are not limited to, LINKEDIN, FACEBOOK, YELP, TWITTER, and a State Bar directory.

As a non-limiting example, the system 100 may run a search on Facebook.com using the first and last name provided by the user 102. The system 100 may gather information from Facebook.com, such as where the user 102 is from (i.e., city and state), where they are employed, what college they attended, etc.

In step 218, the system 100 combines the data collected about the user in steps 212 and 216 into a collection of keywords, referred to herein as a keyword collection. These keywords (in combination with any other data collected about the user 102) will be used to generate one or more candidate domain names for the user 102, as will be discussed in further detail below. In some implementations, additional sources of information may be used to collect information about the user 102 that may be utilized to make candidate domain name recommendations. Example additional sources include those that include the product search history of the user, the user's purchase history, a listing of other products or services that have already been purchased by the user, the user's customer information, the user's responses to a survey as described below, and the like.

After the collection of keywords has been generated, the system 100 can use that collection of keywords to generate one or more candidate domain names for the user 102 that the user 102 may wish to purchase. In some cases, this will involve analyzing, in addition to the collection of keywords, websites of third parties that are relevant to the user or the user's business. In that case, the content of those third party websites can be analyzed to potentially generate additional keywords from which the candidate domain names can be generated or to determine the quality of one or more of the candidate domain names. In some implementations, the system 100 will also determine whether the generated candidate domain names are actually available to be registered. If, for example, a particular candidate domain name has already been registered, that candidate domain name will not be displayed to the user for purchase.

For example, if the user 102 provided input data 214 at step 212 that included words such as "menu" or "food", the system 100 may include these words in the keyword collection at step 218. The words "menu" and "food" from the keyword collection can then be compared to other related websites, such as other restaurant websites, in order to generate one or more candidate domain names relevant to the user's 102 input data 214 at step 222. The candidate domain names provided at step 222 are, therefore, domain names that are relevant to the user 102 and are provided to the user 102 who may not have otherwise been searching for a domain name. Alternatively, if the user 102 was searching for a domain name on the domain name registration website 106, the system 100 may provide the user 102 a link (not shown) to buy more or similar domain names based on the input data 214 and additional data acquired from the third party data sources 204.

In some implementations, the system 100 checks to see if the user already has a registered domain name. If so, the identification of such other domain names can be used to prevent the system 100 from suggesting candidate domain names that are too similar to domain names already registered by the user 102.

In one embodiment of the present invention, the system 100 may be configured to only provide the candidate domain name or alternative domain name at step 222 if a minimum data requirement is met. For example, a new user may utilize one of the client software applications 208 provided by the website 106 and only provide input data 214 that includes their name and email address, for example, at step 212. The minimum data requirement provided by the system 100 may require a minimum of three pieces of information relevant to the user 102. As a non-limiting example, the minimum data requirements may be a name, email address and a location provided by the user 102, either implicitly or explicitly, in order for the system 100 to suggest the candidate or alternate domain name at step 222. Therefore, if the user 102 only provides two pieces of information at step 212, the system may not generate a candidate or alternate domain name at step 222. This minimum data requirement provided by the system 100 may ensure that the candidate and alternate domain names generated at step 222 are in fact relevant to the user 102 based on the keyword collection generated at step 218. Alternatively, a relevance score may be internally generated by the system 100 for the candidate or alternate domain name at step 222 based on the keyword collection currently available. If the relevance score is greater than a predefined threshold, for example, the candidate or alternate domain name would be displayed to the user 102.

Once a candidate domain name or an alternate domain name is generated based on the keyword collection at step 222, the system 100 may provide the user 102 an option to add the domain name to their shopping cart at step 224 for purchase. Step 224 may occur, for example, as the user is going through a checkout process 112 for purchase of the client software application 208. At step 226, the user 102 may checkout and purchase the client software application 208 and, optionally, the domain name generated at step 222.

Figure 8A:
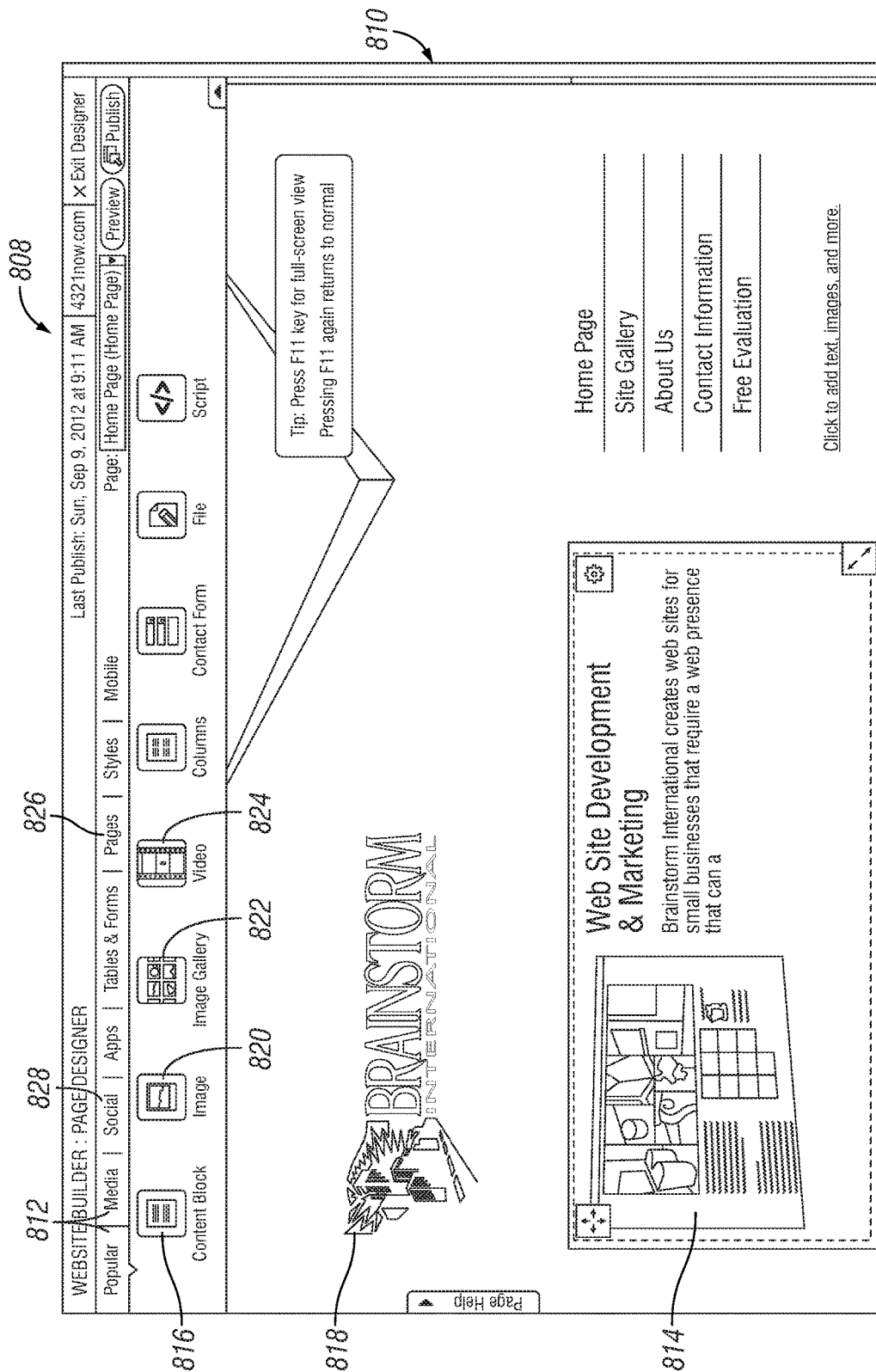
FIG. 8A is a screenshot showing an example user interface by which the requester can build a website using a website builder application.
Figure 8B:
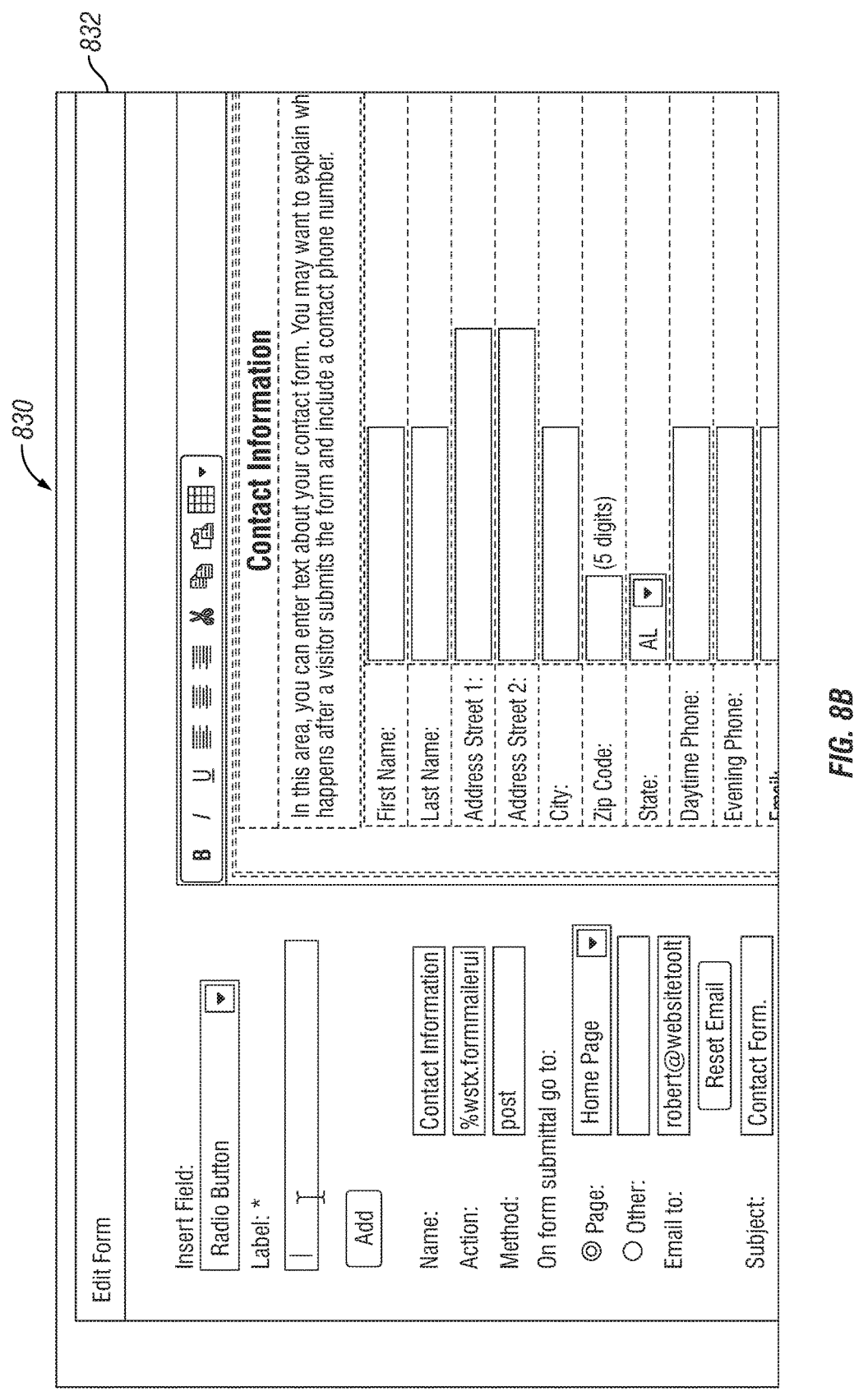
Figure 8C:
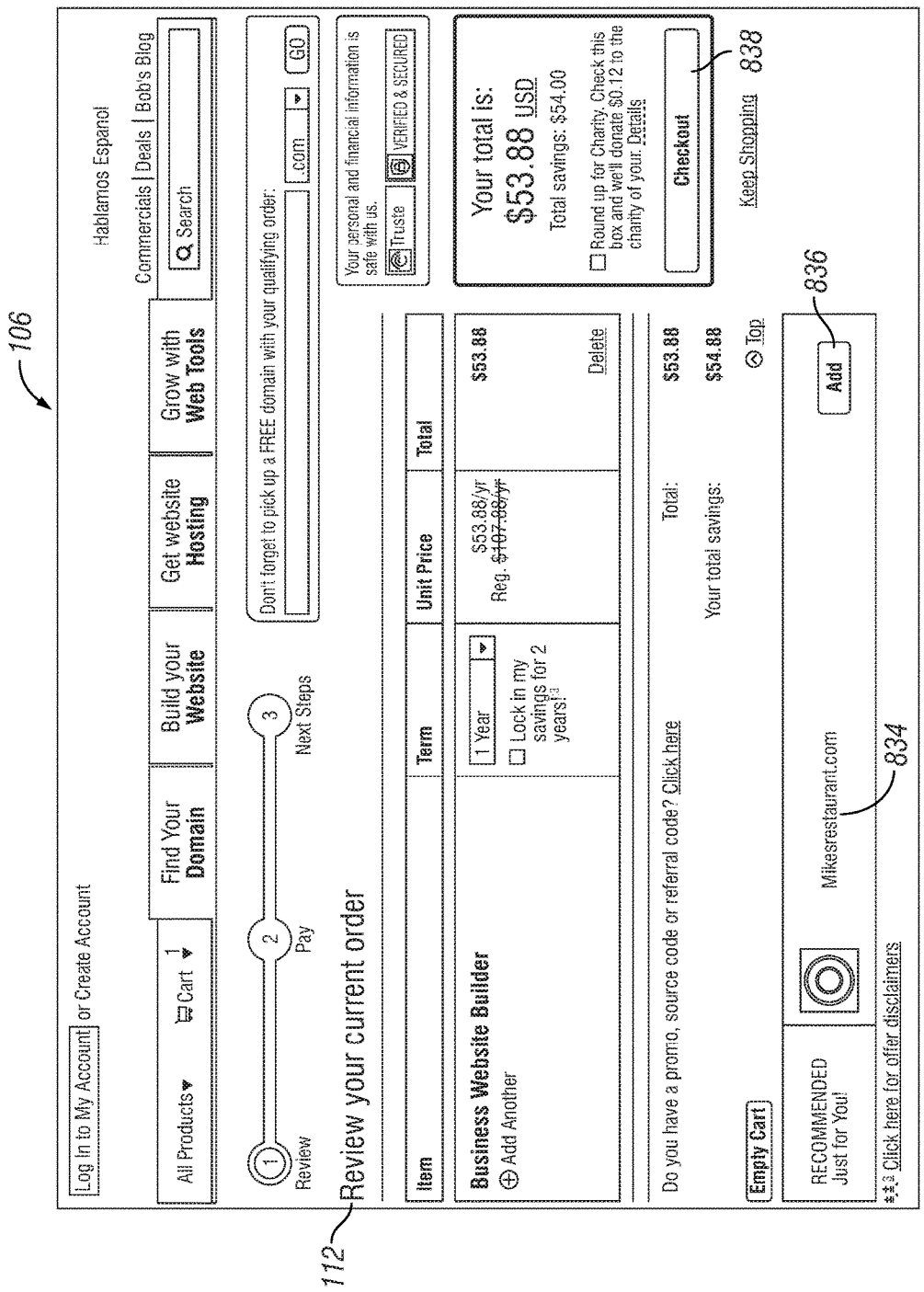
FIG. 8C is a screenshot showing an example checkout page user interface including a candidate domain name.

To illustrate, FIG. 8C is a screenshot showing an example checkout page user interface including a candidate domain name. As shown in FIG. 8C, candidate domain name 834 may be displayed to the user 102 on the website 106. For example, the candidate domain name 834 may be 'mikesrestaurant.com' based on the keywords generated at step 218 of the method of FIG. 2. The candidate domain name 834 may be displayed while the user 102 is going through a checkout process 112 for a website builder application 808, for example. Alternatively, the candidate domain name 834 may be displayed while the user 102 is going through a checkout process 112 for an alternative product or service, such as those provided at step 206 of FIG. 2. The user 102 may choose to add the candidate domain name 834 to their shopping cart by selecting an 'Add' button 836. The user 102 may select a 'checkout' button 838 to complete their purchase of the website builder application 808 and, optionally, the domain name 834 generated at step 222.

Figure 3:
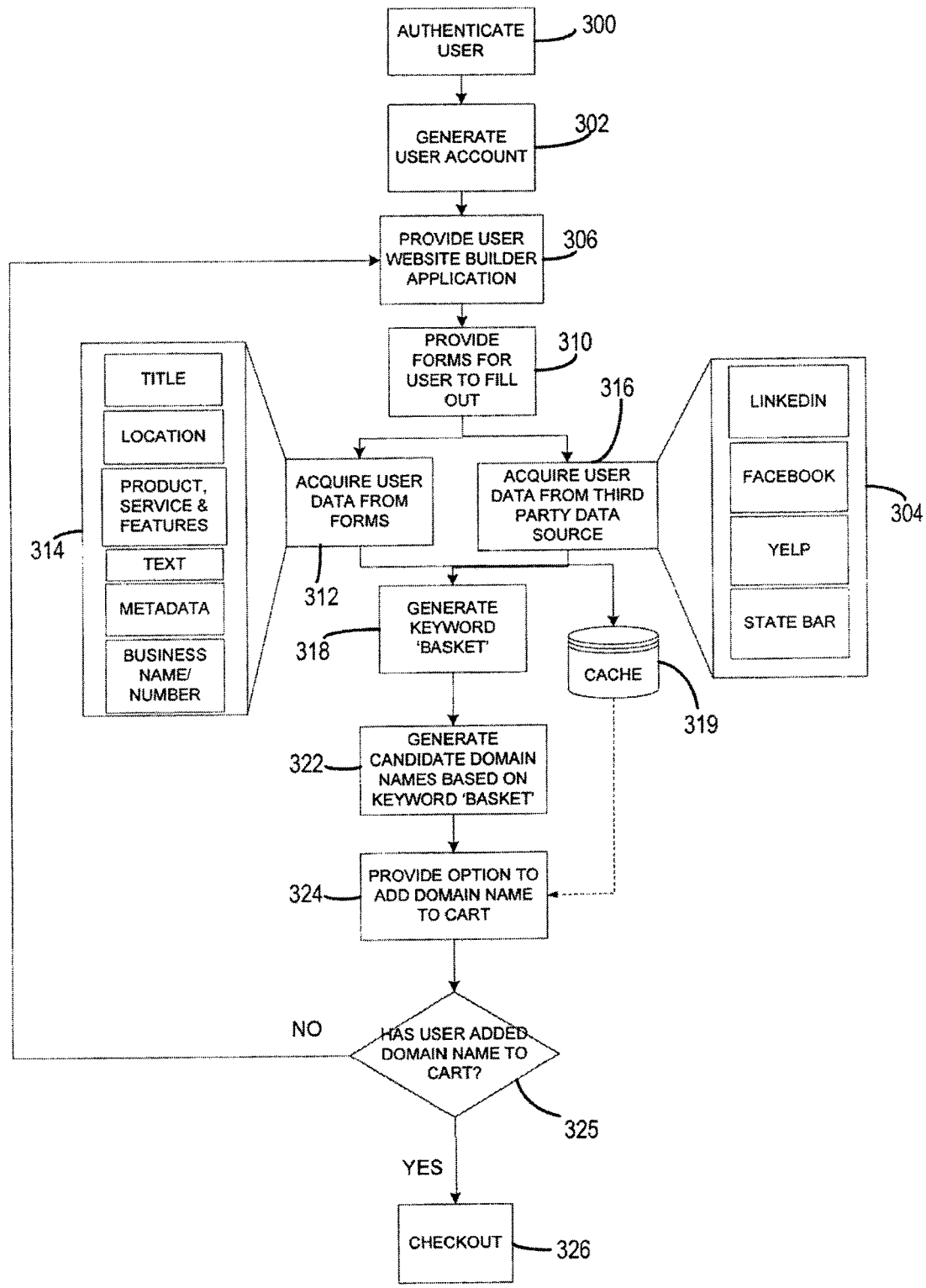
FIG. 3 is a flowchart illustrating a method for generating candidate domain names based on data related to a website builder application.

Turning now to FIG. 3, a flowchart illustrating a method by which candidate domain names can be generated for the user 102 based on data received by the user 102 while utilizing a software application or service, such as a website builder 808, shown in FIG. 8A, is shown. Although the present flowchart and method is described in terms of a user utilizing a specific type of software application (i.e., a website builder), the methods illustrated in FIG. 3 and described herein may be utilized in conjunction with a user utilizing any software application that involves the user supplying information, either explicitly or implicitly, to a software application. For example, the method may be utilized to provide a user with a listing of candidate domain names for purchase while the user is interacting with email software, web hosting management software, accounting software, and the like.

Similarly to the flowchart illustrated in FIG. 2, the user 102 begins by accessing the website 106. In step 300, the user 102 is authenticated as either an existing user or a new user. If the user 102 is an existing user, the website 106 provides the user 102 access to the website builder application 808 at step 306 once the user 102 has logged in with their credentials (i.e., username and password). If the user 102 is a new user, a new user account may be generated at step 302. Once the user account is generated, the website 106 provides the user 102 the website builder application 808 at step 306.

As a new user, the website builder application 808 will provide the user 102 a plurality of website templates (not shown) to begin building their website. The website templates are pre-designed and may be related to categories such as business and services, music, entertainment, online shop, restaurant and hospitality, photography, design, retail and fashion, personal, etc. Once a template is selected, the user 102 can begin building a website using the website builder application 808. As such, the user 102 is provided with a user interface 810, such as that shown in FIG. 8A. Within the interface, menu options 812 may be provided on the user interface 810 to assist the user 102 in building their website. Beginning with a home page, as shown in FIG. 8A, the user 102 may add a content block 814 to the website, for example, that gives a brief description of the website being built. The user 102 simply drags a content block icon 816 to the desired location on the user interface 810 and the user 102 can type directly into the content block 814.

Additionally, the user 102 may add an image 818 (e.g., a company logo) to the home page of the website by simply dragging the image icon 820 to the desired location on the user interface 810. The image 818 may be provided by the user 102 or may be a stock image provided by the website builder application 808. Similarly, the user has the option to add image galleries or video, for example, to their website by simply dragging an image gallery icon 822 or a video icon 824 to the desired location on the user interface 810. The user 102 further has the option to add additional pages to their website by selecting the pages 826 menu option. Other pages 826, may include, but are not limited to, a site gallery page, an about us page, a contact information page, an online store page, a site map, a forum page, etc. The user 102 also has the option to provide a link to their social web pages (e.g., LINKEDIN, TWITTER, FACEBOOK, etc.) by selecting a social menu option 828, as will be discussed in further detail below.

Returning to the flowchart illustrated in FIG. 3, the user 102 may navigate, edit, and update their website using the website builder application 808 as described above and provided at step 306. At step 310, while the user 102 edits their website using the website builder application 808, various forms, such as user information forms, business information forms, user contact forms, website information forms, etc., may be provided to the user 102 for the user 102 to complete. For example, when the user 102 adds a content block 814 to the website, adds images 818, image galleries, videos or updates a contact information page 830, as shown in FIG. 8B, each action may involve the user completing forms other otherwise providing information to the website builder application 808. The forms may vary depending on which menu option the user 102 is utilizing. In some cases, the forms include explicit user input devices (e.g., textboxes, check boxes, radio buttons, and the like) into which the user provides input. Alternatively, the forms may be incorporated into other user interfaces allowing the user to add content to or revise content within the user's website. For example, the interface through which the user adds images to their website is considered a form, as is the mechanism by which the user adds video. Furthermore, the interface through which the user responds to survey questions as described below may be considered a form. Regardless of the menu options 812 being used, the server 110 shown in FIG. 1 acquires data from the user 102 as the user manipulates their website using the website builder application 808.

For example, the user 102 may fill out a user contact information form 832 while creating or editing the contact information page 830 of their website, as shown in FIG. 8B. The user contact information form 832 may enable the user 102 to provide input data 314 such as a first name, last name, address, city, state, zip code, phone number, etc. Returning to FIG. 2, after capturing the input data 314, the system 100 may be configured to acquire additional data about the user 102 or the user's business from third party data sources 304 at step 316. For example, if the user 102 provides their first and last name on the user contact information form 832, the system 100 may run a search on the third party data sources 304 using the user's 102 first and last name to gather additional information about the user 102. The third party data sources 304 may include, but are not limited to, LINKEDIN, FACEBOOK, YELP, TWITTER and a State Bar directory. As a non-limiting example, the system 100 may run a search on Facebook.com using the first and last name provided by the user 102. The system 100 may gather information from Facebook.com, such as where the user 102 is from (i.e., city and state), where they are employed, what college they attended, etc.

The system 100 provides an integration module (not shown) to generate a keyword collection at step 318 by running a content analysis (e.g., crawl) on the website being built by the user 102 that identifies keywords throughout the pages of the website. The keyword collection may contain, for example, keywords related to the user 102 acquired at steps 312 and 316, keywords selected from title text on the user's website, and information collected from third party sources about the user or the user's business. A cache storage database 319 may be provided by the system 100 to store the input data 314 provided by the user 102 at step 312 and to store data related to the user 102 acquired from the third party data sources 304 at step 316. The keywords generated at step 318 will be used to generate a candidate domain name for the user 102, as will be discussed in further detail below.

After the collection of keywords has been generated, the system 100 can use that collection of keywords to generate one or more candidate domain names for the user 102 that the user 102 may wish to purchase. In some cases, this will involve analyzing, in addition to the collection of keywords, websites of third parties that are relevant to the user or the user's business. In that case, the content of those third party websites can be analyzed to potentially generate additional keywords from which the candidate domain names can be generated.

In some implementations, the system 100 checks to see if the user already has a registered domain name. If so, the identification of these other domain names can be used to prevent the system 100 from suggesting candidate domain names that are too close to domain names already registered by the user 102.

Figure 8D:
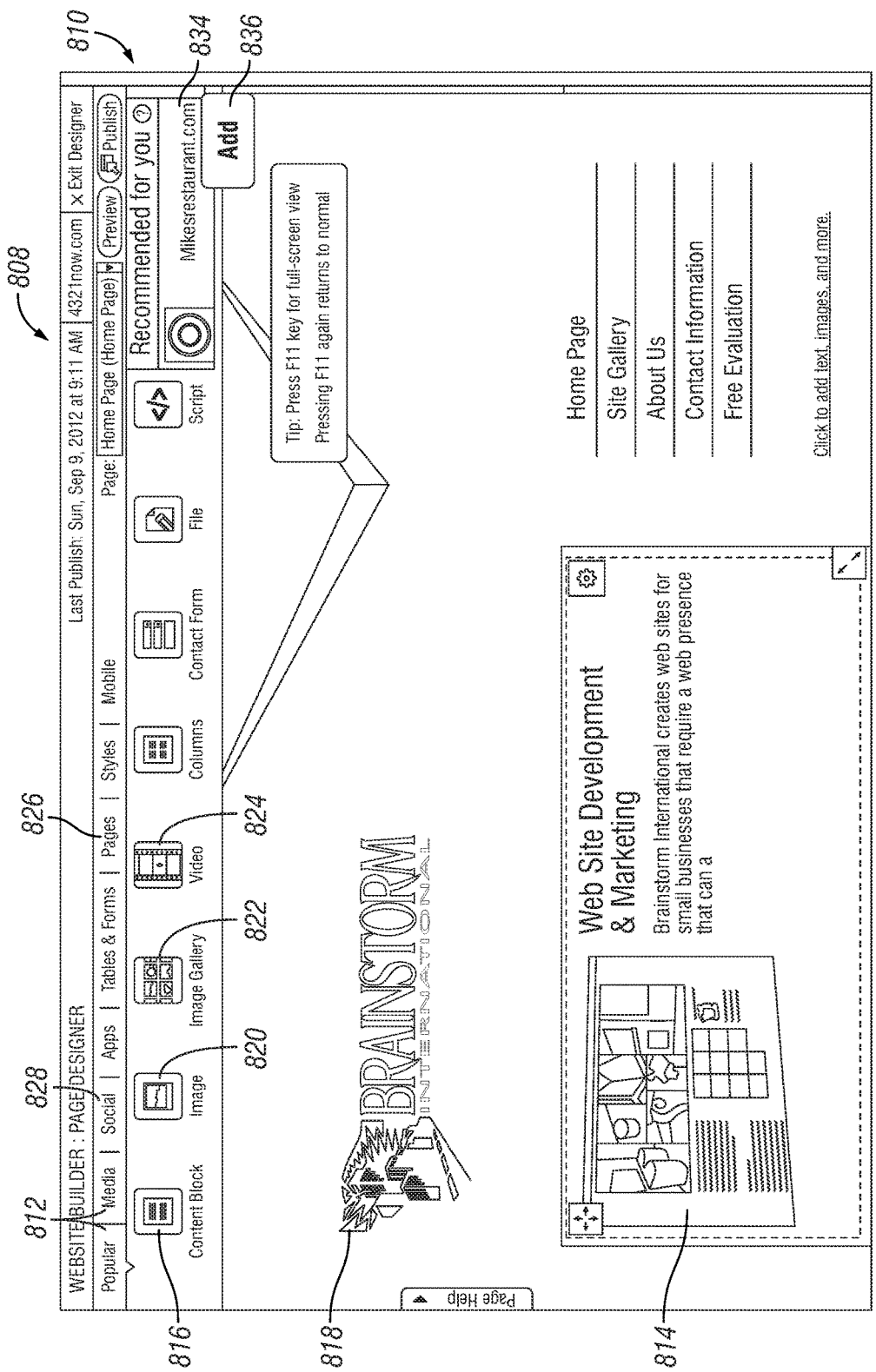
FIG. 8D is a screenshot showing a website builder user interface including a candidate domain name.

Once a candidate domain name or an alternate domain name is generated based on the keyword collection at step 322, the system 100 may provide the user 102 an option to add the domain name to their shopping cart at step 324 for purchase as part of the website builder interface. For example, FIG. 8D shows a web site builder user interface 808 (e.g., the user interface of FIG. 8A), modified to incorporate or display candidate domain name 834 that may be offered for purchase by the user. Candidate domain name 834 may be displayed on each user interface screen presented by the web site builder interface until, for example, candidate domain name 834 is either dismissed by the user, or the user decides to purchase or register the candidate domain name. Candidate domain name 834 may only be displayed in the user interface once sufficient keywords have been collected to generate a candidate domain name with sufficient confidence. With reference to FIG. 8D, the user can choose to add the candidate domain name 834 to their shopping cart by selecting an 'Add' button 836. The user will then be given an opportunity to purchase or register the domain name.

Returning to FIG. 3, at step 325, the user 102 may choose to add the candidate domain name 834 to their shopping cart by selecting an 'Add' button 836. At step 326, the user 102 may select a 'checkout' button 838 to complete their purchase of the website builder application 808 and, optionally, the domain name 834 generated at step 322.

As indicated by step 325, if the user 102 does not elect to purchase one of the candidate domain names, the method repeats and the system 100 continues providing the website builder application to the user and monitoring the user's actions. As such, additional revisions or changes to the user's website can be captured, in which case a new listing of candidate domain names may be generated and displayed for purchase by the user 102. Accordingly, if the user 102 does not elect to purchase one of the candidate domain names, the system 100 returns to step 306 to again provide the website builder application to the user and monitor whether the user 102 is updating or adding data 314 to their website. During this process, the system 100 provides the cache storage 319 in order to store the recently updated and added data 314, as well as the data acquired from third party data sources 304. In this sense, the system 100 may access the cache storage 319 to quickly generate either the candidate or alternate domain name at step 322 and provide the user 102 the option to add the domain name to their shopping cart at step 324.

In various implementations, the method illustrated in FIG. 3 may be continually executed as the user interacts with and utilizes the website builder application (or other software application). As such, the listing of candidate domain names can be continually updated as the user interacts with the software, providing new information and/or revising existing information. As such, while the user utilizes the software application, the listing of candidate domain names will continuously be refreshed and will always represent a list of potential domain names that are closely relevant to the content being supplied by the user into the software application.

Figure 4:
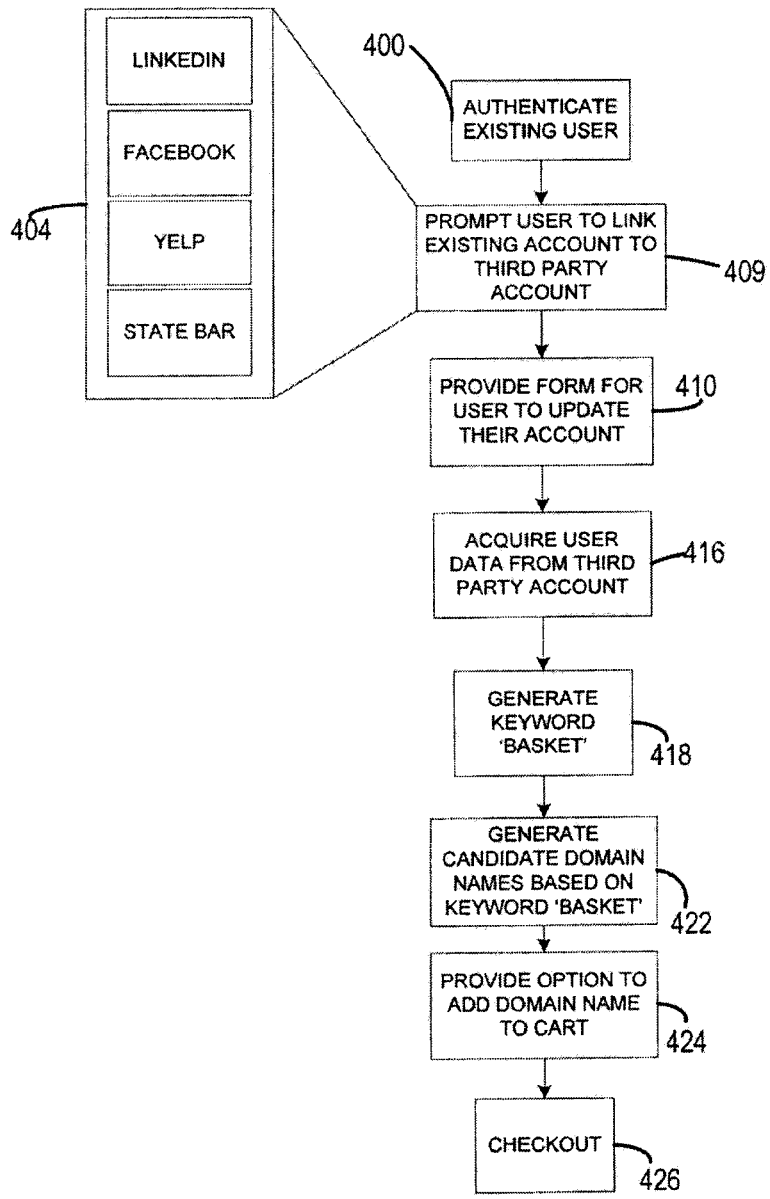
FIG. 4 is a flowchart illustrating a method for generating candidate domain names based on data received from a user and a third party data source.

Turning now to FIG. 4, a flowchart illustrating a method by which candidate domain names can be generated for the user 102 based on data acquired from third party data sources 404 is shown. The user 102 in this case may be an existing user and may begin by accessing the website 106. In step 400, the user 102 is authenticated as an existing user. Once authenticated, the user may begin using one or more software applications made available by the website 106 or may access the user's account information. While interacting with the website 106, the user 102 determines that he or she wishes to link their account to an external third party account. Accordingly, while interacting with the website 106 the user 102 may activate a user interface enabling the user to begin the process of linking their account with a third party account. The process of linking the user's 102 account with a third party account may be accomplished at a user account level.

Figure 9A:
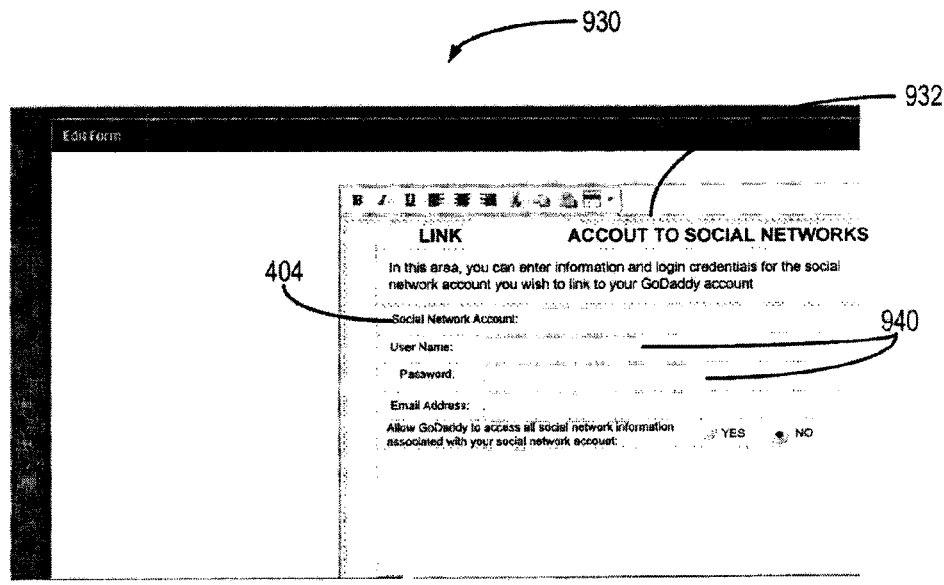
FIG. 9A is a screenshot showing an example user interface by which the requester can link a user account to a third party data source.
Figure 9B:
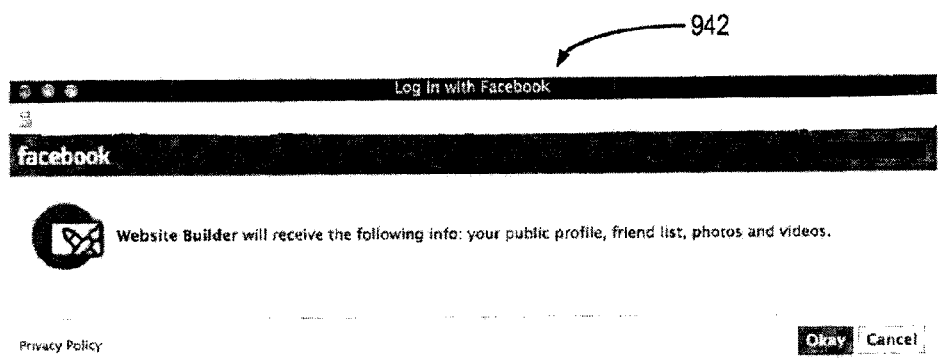
FIG. 9B is a screenshot showing an example confirmation page by which the requester can confirm linkage of their user account to the third party data source.

At step 409, the system 100 prompts the user 102 to link their existing user account to a third party account 404. As a non-limiting example, the third party account 404 may include the user's 102 LINKEDIN, FACEBOOK, YELP, State Bar or TWITTER account. At step 410, a user information form 932, as shown in FIG. 9A, is provided to the user 102. The user information form 932 may include, for example, a login window 940 that enables the user 102 to log into their third party account 404 and grant the system 100 permission to access the third party account 404. In order to link the third party account 404 (e.g., a social network account), the system 100 may use standard connection protocols provided by the third party data sources such as, FACEBOOK connect, FACEBOOK pages or LINKEDIN Company page. Alternatively, the system 100 may request that the user 102 provide their public URL to third party data sources (e.g., TWITTER handle, YELP URL). Once linked, a verification screen 942, as shown in FIG. 9B, may appear on the website of the user's 102 third party data source confirming that their user account is now linked and has access to the information provided by the third party data source. The system 100 may then acquire data about the user 102 from the newly linked third party data sources 404 at step 416. For example, the system 100 may run a search on the third party data sources 404 using the user's 102 first and last name to gather additional information about the user 102. The third party data sources 404 may include, but are not limited to, LINKEDIN, FACEBOOK, YELP, TWITTER and a State Bar directory. The system 100 may gather information from Facebook.com, for example, such as where the user 102 is from (i.e., city and state), where they are employed, what college they attended, etc.

The system 100 provides an integration module (not shown) to generate a keyword collection at step 418. The keyword collection may contain, for example, keywords related to the user 102 acquired at step 416. These keywords will be used to generate a candidate domain name for the user 102, as will be discussed in further detail below.

After the collection of keywords has been generated, the system 100 can use that collection of keywords to generate one or more candidate domain names for the user 102 that the user 102 may wish to purchase. In some cases, this will involve analyzing, in addition to the collection of keywords, websites of third parties that are relevant to the user or the user's business. In that case, the content of those third party website's can be analyzed to potentially generate additional keywords from which the candidate domain names can be generated.

In some implementations, the system 100 checks to see if the user already has a registered domain name. If so, the identification of these other domain names can be used to prevent the system 100 from suggesting candidate domain names that are too close to domain names already registered by the user 102.

Once a candidate domain name or an alternate domain name is generated based on the keyword collection at step 422, the system 100 may provide the user 102 an option to add the domain name to their shopping cart at step 424 for purchase. Step 424 may occur, for example, as the user is going through a checkout process 112 for a client software application 408 or is otherwise navigating website 106, as previously discussed. At step 426, the user 102 may checkout and purchase the domain name generated at step 422.

Figure 5:
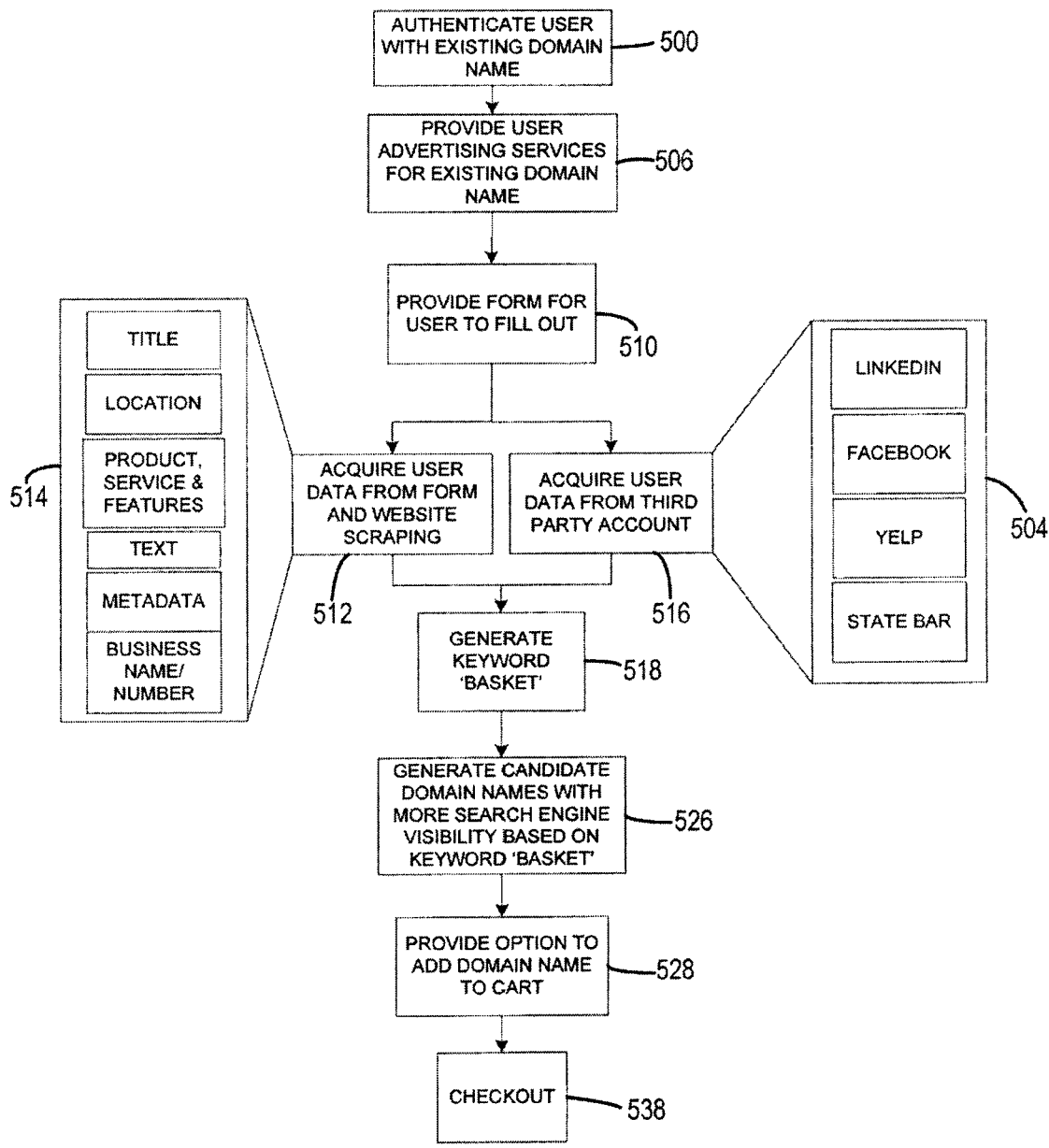
FIG. 5 is a flowchart illustrating a method for generating candidate domain names based on data relating to advertising services.

Turning now to FIG. 5, a flowchart illustrating a method by which candidate domain names can be generated for the user 102 based on input data 514 related to an advertising software application 508 or other advertising services is shown. The method shown in FIG. 5 may be useful, for example, to assist a user that already has a website, but wishes to add advertising to the website. However, the user may be unaware that the domain name that they have selected for their existing website is not particularly suited to the type of advertising that will be displayed thereon. In that case, the present method may be useful to make recommendations of improved domain names for the user that the user may wish to register at the same time the advertising services are purchased.

The user 102 in this case may be an existing user and may begin by accessing the website 106. The user 102 may be any Internet user, for example, who may wish to incorporate advertising into an existing website hosted at a particular domain name. As such, the user accesses the website 106 to execute advertising software application 508, which is configured to assist the user 102 in incorporating advertising into the user's website.

In step 500, the user 102 is authenticated as a user having an existing website. At step 506, the website 106 provides the user 102 the advertising software application 508, which allows the user 102 to add advertising features to their existing website.

Figure 10:
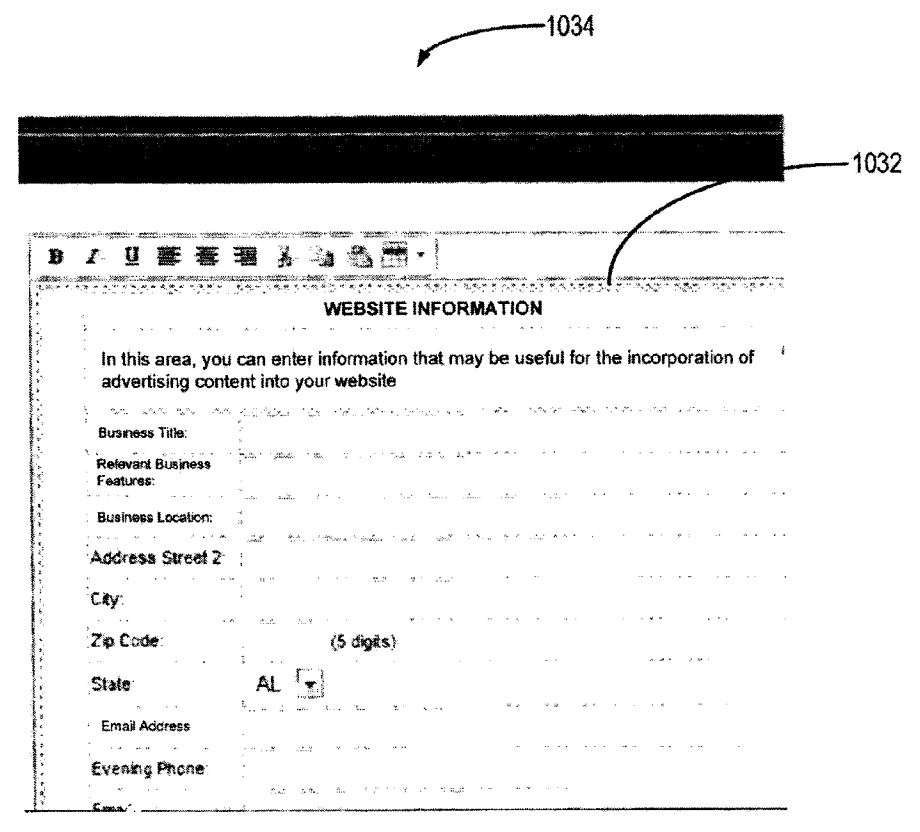

At step 510, a website information form 1032, as shown in FIG. 10, can be provided to the user 102 on a website information page 1034 requesting that the user provide information useful for the incorporation of advertising content into the user's website. The website information form 1032 may enable the user 102 to provide input data 514 that includes, but is not limited to, a title (e.g., a business name), a location (e.g., home and/or business address, city, state, zip code, etc.), a phone number, features relevant to the user's 102 products and services, email address, business website, business tagline, business category, text, and metadata such as images provided by the user 102 or the website 106 at step 512. The server 110 shown in FIG. 1 acquires data from the user 102 as the business information form 1032 is filled out. At this point, the system 100 also knows the domain name of the user's existing website and can thereby access the user's existing website to collect one or more keywords therefrom. Accordingly, at step 512, the system 100 may automatically scrape the user's 102 existing website using web scraping software capable of scraping all the pages on the user's 102 existing website to gather data including, but not limited to page titles, business location data, product features and services, metadata from images and pages, etc. to generate the keyword collection. Additionally, if an advertising campaign has been in place for some time for the web site, the collection of keywords may include keywords that are determined to have performed well in the advertising campaign.

As the user 102 is providing the input data 514, the system 100 may be configured to acquire additional data about the user 102 from third party data sources 504 at step 516. For example, if the user 102 provides their first and last name on the business information form, the system 100 may run a search on the third party data sources 504 using the user's 102 first and last name to gather additional information about the user 102. The third party data sources 504 may include, but are not limited to, LINKEDIN, FACEBOOK, YELP, TWITTER and a State Bar directory. As a non-limiting example, the system 100 may run a search on Facebook.com using the first and last name provided by the user 102. The system 100 may gather information from Facebook.com, such as where the user 102 is from (i.e., city and state), where they are employed, what college they attended, etc.

The system 100 provides an integration module (not shown) to generate a keyword collection at step 518. The keyword collection may contain, for example, keywords related to the user 102 acquired at steps 512 and 516 and generated by analysis of the user's existing website. These keywords will be used to generate a candidate domain name for the user 102, as will be discussed in further detail below.

At step 526, the system 100 generates a number of candidate domain names for the user using the keyword collection and the information collected in steps 512 and 516. In one implementation, before performing step 526, the system 100 may first determine a quality rating for the user's existing website. For example, the system may determine a search engine visibility rating, for example, of the user's 102 existing domain name based on the input data 514. The search engine visibility rating, may be a numerical rating, for example, that indicates whether the user's existing domain name is highly visible or not when other users perform queries on search engines such as, BING, YAHOO, GOOGLE, AOL, etc. If the search engine visibility rating for the user's existing domain name is sufficiently low (e.g., below a pre-determined threshold), the system 100 may generate the candidate domain names for the user 102 based on their existing search engine visibility rating and the keyword collection generated at step 518. The candidate domain names displayed will therefore be relevant to the user 102 and, specifically, the user's website. The use of any one of the domain names generated at step 526 may increase the website's traffic, and consequently, sales if the users 102 website hosts an online store, for example.

Once the candidate domain names are generated based on the keyword collection at step 526, the system 100 may provide the user 102 an option to add one or more of the candidate domain names to their shopping cart at step 528 for purchase. Step 528 may occur, for example, as the user is going through a checkout process 112 for the advertising software application 508, as previously discussed with respect to FIG. 8C. At step 538, the user 102 may checkout and purchase the advertising services and, optionally, the domain name generated at step 526.

Figure 11:
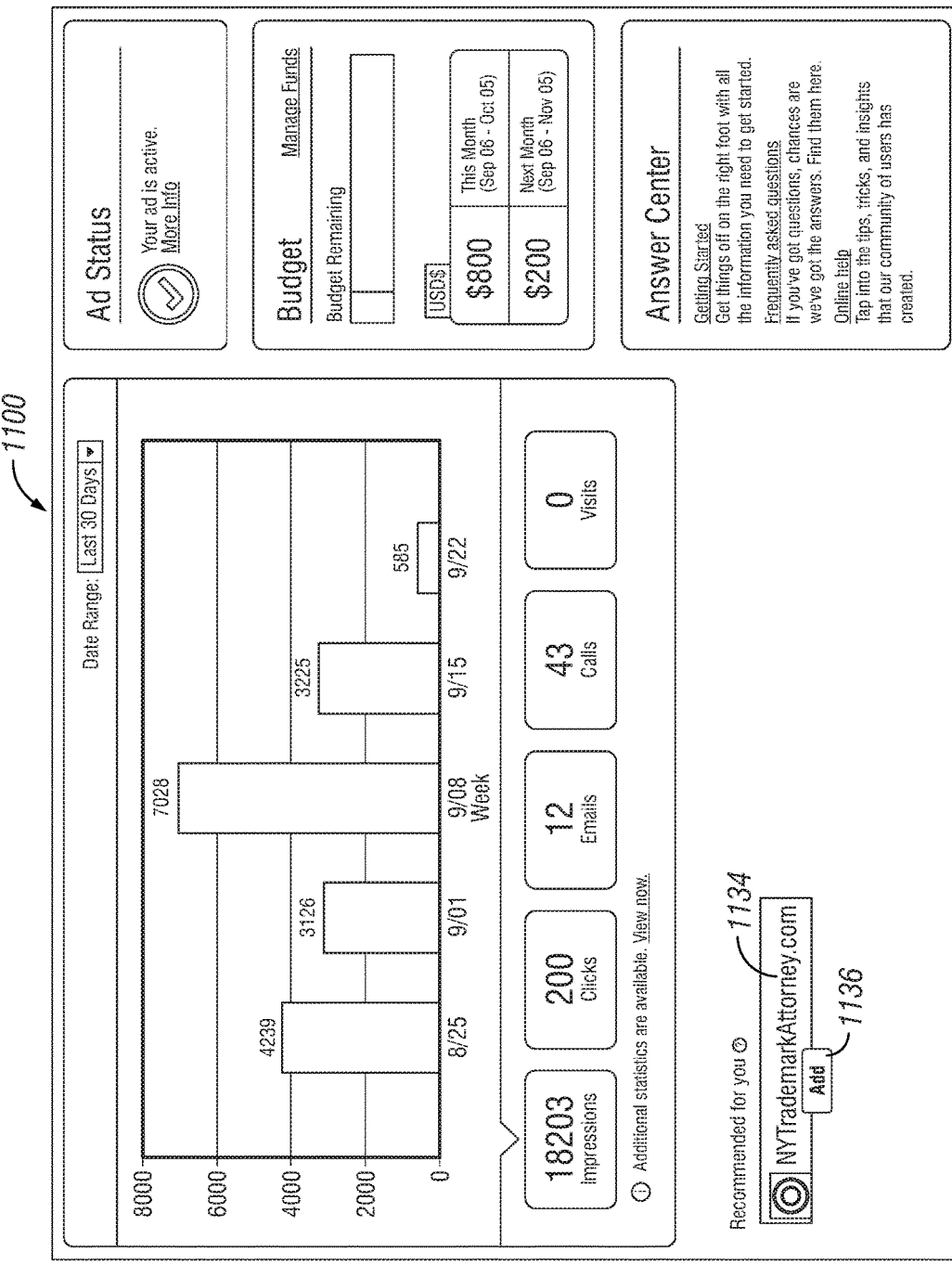
FIG. 11 is a screenshot showing an example user interface providing a dashboard of an advertising campaign and including a candidate domain name.

In some cases, the candidate domain names will be displayed on a user interface utilized by a user to monitor their advertising campaign. For example, FIG. 11 depicts user interface 1100. User interface 1100 provides a dashboard enabling a user to review the status of their current advertising or marketing campaign and provides information such as the number of impressions and clicks the web page has received, as well as a budget status of the advertising campaign. As the campaign proceeds, and certain keywords in the campaign are identified as generating increased traffic, candidate domain names can be generated based upon those successful keywords. Once generated, those candidate domain names can be provided to the user for potential purchase or registration. As such, user interface 1100 includes candidate domain name 1134. The user 102 may choose to add the candidate domain name 1134 to their shopping cart by selecting an 'Add' button 1136. The user will then be given an opportunity to purchase or register the domain name.

Figure 6:
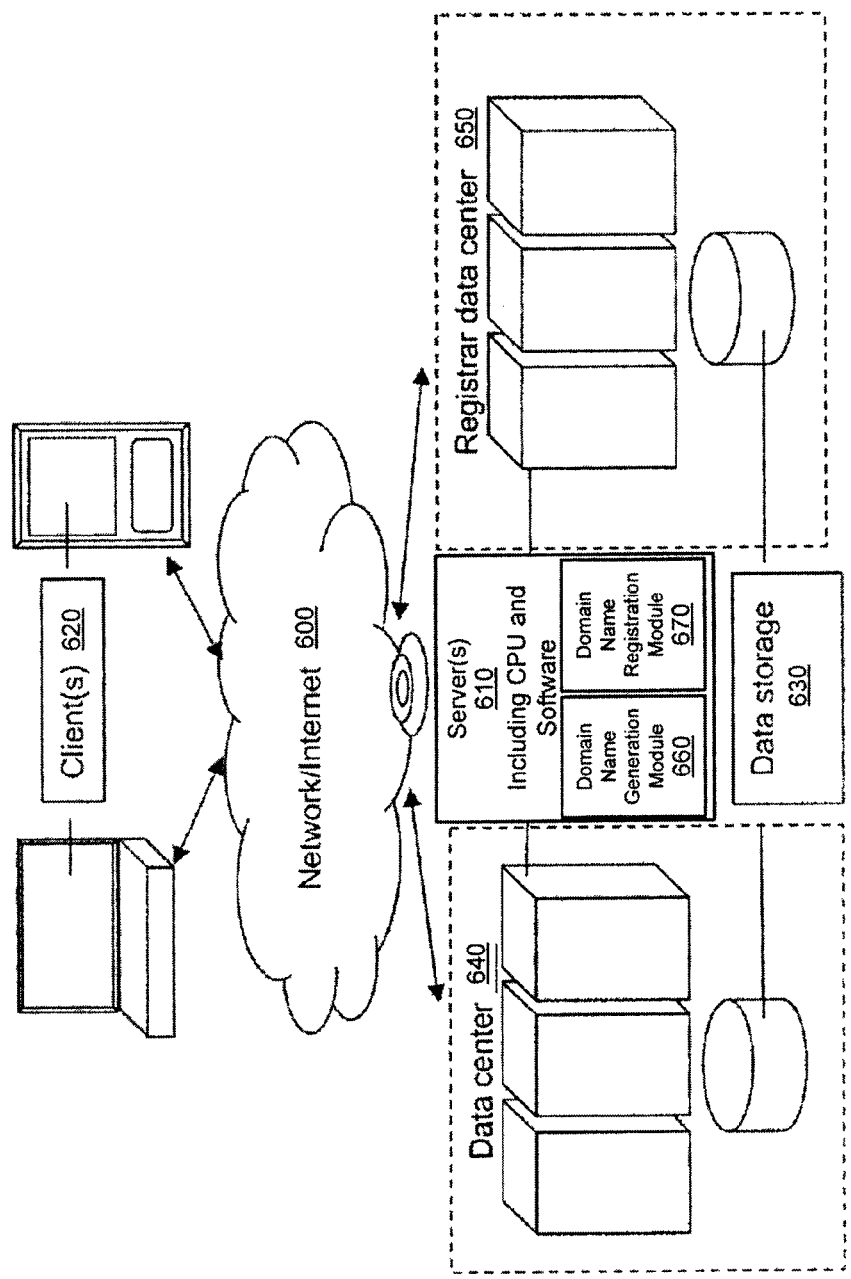
FIG. 6 illustrates a possible embodiment of a system for generating the candidate domain name.
Figure 7:
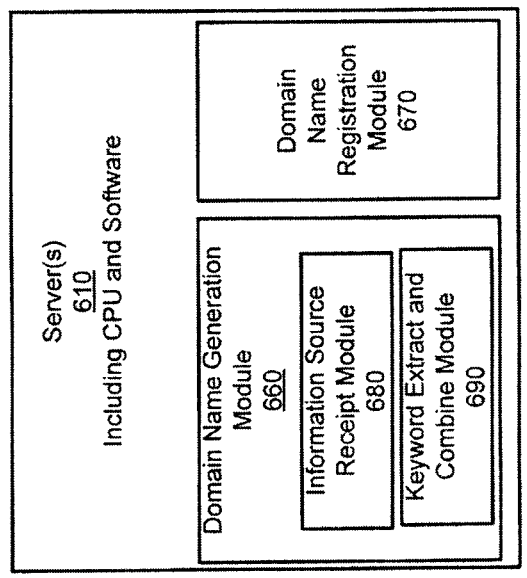
FIG. 7 illustrates a possible embodiment of a server included in the system of FIG. 6.

Several different environments may be used to accomplish the steps of embodiments disclosed herein. FIGS. 6 and 7 demonstrate a streamlined example of such an environment and illustrate a non-limiting example of a system and/or structure that may be used to accomplish the methods and embodiments disclosed and described herein. Such methods may be performed by any central processing unit (CPU) in any computing system, such as a microprocessor running on at least one server 610 and/or client 620, and executing instructions stored (perhaps as scripts and/or software, possibly as software modules) in computer-readable media accessible to the CPU, such as a hard disk drive on a server 610 and/or client 620.

The example embodiments herein place no limitations on whom or what may comprise users. Thus, as non-limiting examples, users may comprise any individual, entity, business, corporation, partnership, organization, governmental entity, and/or educational institution.

The example embodiments shown and described herein exist within the framework of a network 600 and should not limit possible network configuration or connectivity. Such a network 600 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 610 and at least one client 620 may be communicatively coupled to the network 600 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 610 and client(s) 620 (along with software modules and the data storage 630 disclosed herein) may be communicatively coupled to the network 600 and to each other in such a way as to allow the exchange of information required to accomplish the method steps disclosed herein, including, but not limited to receiving the information from a user interface on one or more clients 620, and one or more servers 610 receiving the information.

The client 620 may be any computer or program that provides services to other computers, programs, or users either in the same computer or over a computer network 600. As non-limiting examples, the client 620 may be an application, communication, mail, database, proxy, fax, file, media, web, peer-to-peer, or standalone computer, cell phone, "smart" phone, personal digital assistant (PDA), etc. which may contain an operating system, a full file system, a plurality of other necessary utilities or applications or any combination thereof on the client 620. Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof.

The client computer(s) 620 which may be operated by one or more users and may be used to connect to the network 600 to accomplish the illustrated embodiments may include, but are not limited to, a desktop computer, a laptop computer, a hand held computer, a terminal, a television, a television set top box, a cellular phone, a wireless phone, a wireless hand held device, a "smart" phone, an Internet access device, a rich client, thin client, or any other client functional with a client/server computing architecture. Client software may be used for authenticated remote access to one more hosting computers or servers, described below. These may be, but are not limited to being accessed by a remote desktop program and/or a web browser, as are known in the art.

The user interface displayed on the client(s) 620 or the server(s) 610 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in and after FIG. 8A, including Touch interfaces, Conversational Interface Agents, Live User Interfaces (LUI), Command line interfaces, Non-command user interfaces, Object-oriented User Interfaces (OOUI) or Voice user interfaces. Any information generated by the user, or any other information, may be accepted using any field, widget and/or control used in such interfaces, including but not limited to a text-box, text field, button, hyper-link, list, drop-down list, check-box, radio button, data grid, icon, graphical image, embedded link, etc.

The software modules used in the context of the current invention may be stored in the memory of- and run on-at least one server 610 and/or client 620. The software modules may comprise software and/or scripts containing instructions that, when executed by a microprocessor on a server 610 and/or client 620, cause the microprocessor to accomplish the purpose of the module or the methods disclosed herein.

The software modules may interact and/or exchange information via an Application Programming Interface or API. An API may be a software-to-software interface that specifies the protocol defining how independent computer programs interact or communicate with each other. The API may allow a requesting party's software to communicate and interact with the software application and/or its provider-perhaps over a network-through a series of function calls (requests for services). It may comprise an interface provided by the software application and/or its provider to support function calls made of the software application by other computer programs, perhaps those utilized by the requesting party to provide information for publishing or posting domain name and hosted website information.

The API may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

The software modules may also include mobile applications, possibly on a client computer and/or mobile device. These mobile applications, or "apps" may comprise computer software designed to help people perform an activity and designed to help the user to perform singular or multiple related specific tasks. It helps to solve problems in the real world by manipulating text, numbers, graphics, or a combination of these elements.

The server(s) utilized within the disclosed system 100 may comprise any computer or program that provides services to other computers, programs, or users either in the same computer or over a computer network 600. As non-limiting examples, the server 610 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof).

The server 610 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The server(s) 610 or software modules within the server(s) 610 may use query languages such as MSSQL or MySQL to retrieve the content from data storage 630. Server-side scripting languages such as ASP, PHP, CGI/Perl, proprietary scripting software/modules/components etc. may be used to process the retrieved data. The retrieved data may be analyzed in order to determine information recognized by the scripting language, information to be matched to those found in data storage, availability of requested information, comparisons to information displayed and input/selected from the user interface or any other content retrieval within the method steps disclosed herein.

The server 610 and/or client 620 may be communicatively coupled to data storage 630 to retrieve any information requested. The data storage 630 may be any computer components, devices, and/or recording media that may retain digital data used for computing for some interval of time. The storage may be capable of retaining stored content for any data requested, on a single machine or in a cluster of computers over the network 600, in separate memory areas of the same machine such as different hard drives, or in separate partitions within the same hard drive, such as a database partition.

Non-limiting examples of the data storage 630 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 630 may comprise any collection of data. As non-limiting examples, the data storage 630 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

As seen in FIG. 6, the server(s) 610 and data storage 630 may exist and/or be hosted in one or more data centers (640, 650). These data centers 640/650 may provide hosting services for websites, services or software relating to stored information, or any related hosted website including, but not limited to hosting one or more computers or servers in a data center 640/650 as well as providing the general infrastructure necessary to offer hosting services to Internet users including hardware, software, Internet web sites, hosting servers, and electronic communication means necessary to connect multiple computers and/or servers to the Internet or any other network 600. These data centers 640/650 or the related clients 620 may accept messages from text messages, SMS, web, mobile web, instant message, third party API projects or other third party applications.

As users access and/or input information, this information may be redirected and distributed between and among the data centers (640, 650) via commands from any combination of software modules hosted on the server(s) 610 and executed via processors on the server(s) 610. This information may then be accessed and manipulated by the combination of software modules or stored in the data storage 630 of any of a plurality of data centers, either separate from or integrated into the one or more servers, so that the information is available to be searched and accessed by the user and/or any other components of any or all data centers.

Any references to "software combination," "combination of software," "combination of software modules" etc. referred to herein may include any combination of software modules executed by a microprocessor on either the server 610 or client 620 computers. These software modules may also be used in combination with any other hardware or software structures disclosed herein. The servers 610 may be hosted in any data center (640, 650) operated by any hosting provider such as those disclosed herein and the servers 610 and clients 620 may be operated by any users disclosed herein.

The system also may comprise a domain name generation module 660 that may be stored in the memory of—and run on—at least one server 610 and may comprise any software and/or scripts containing instructions that, when executed by the server's 610 microprocessor, cause the microprocessor to generate a domain name relevant to the keyword collection. As illustrated in FIG. 7, the domain name generation module 660 may comprise an information source receipt module 680 and a keyword extraction and combination module 690. The information source receipt module 680 may comprise scripts and/or software running on the server 610 that operates to obtain a plurality of data from any information source. As described in detail above, the information source forming the basis of generated domain names may comprise any collection of data, accessible to the domain name generation module 660 that may contain data regarding the user and/or the user's business, for example, including, but not limited to websites, web pages, news feeds, and/or Real Simple Syndication (RSS) feeds.

The keyword extraction and combination module 690 also may comprise software and/or scripts running on the server 610 and may operate to parse received data into a plurality of keywords, combine keywords into a root name, and concatenate a top level domain to the root name, thereby generating the candidate or alternate domain name. In one possible embodiment, the keyword extraction and combination module 690 also may determine a topic to which each keyword relates, sort the keywords into subcategories according to topic, and generate a root name by combining keywords from the same subcategory. A domain name relevant to the keyword collection is thereby generated after a TLD is concatenated to the root name. Modules 680 and 690 may comprise any software and/or scripts running on the server 610 that may accomplish the methods described in detail above.

The system also may comprise a domain name registration module 670 running on at least one server 610 and offering the generated domain name for registration (if available). This module may comprise software and/or scripts containing instructions that, when executed by the server's 610 microprocessor, cause the microprocessor to determine whether the domain name is available for registration and provide the domain name for registration, if available. Additionally, the domain name registration module 670 may, if the domain name is available, register the domain name to the registrant. It may comprise any domain name registration system known in the art or developed in the future including, but not limited to, a website enabled domain name purchase and registration system, such as that described in detail above and/or may be available on GODADDY.COM's website. The domain names database may comprise, as non-limiting examples, a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

Figure 12:
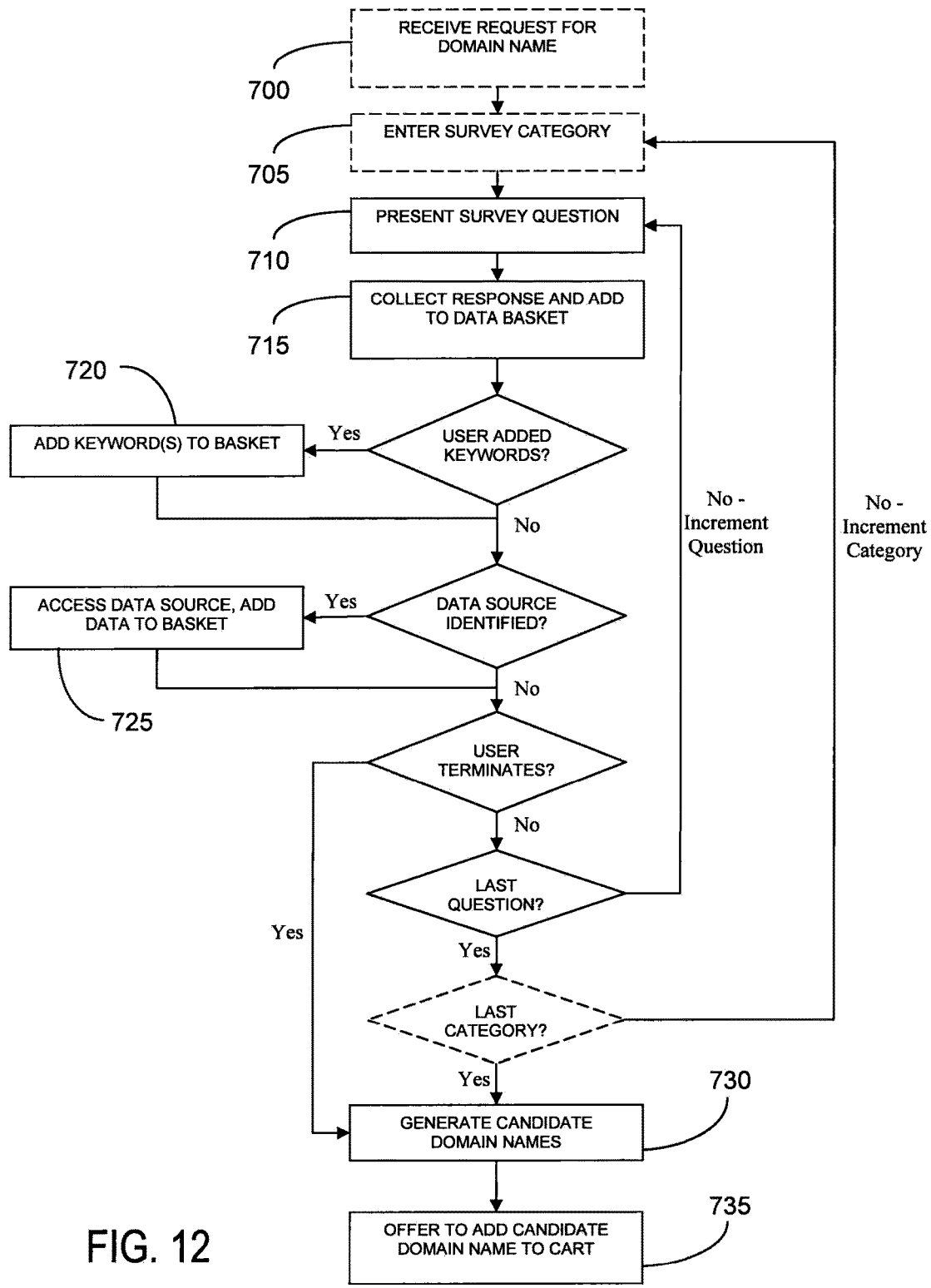
FIG. 12 is a flowchart illustrating a method for generating candidate domain names using a drill-down survey.

In another embodiment of the described system and methods, which may be implemented in conjunction with or alternatively to any of the embodiments described above, the generation of candidate domain names may be informed and refined by analyzing a user's responses to a drill-down survey comprising a series of questions. Referring to FIG. 12, a flowchart illustrating a method by which candidate domain names can be generated for the user 102 based on survey question responses is shown, with dashed boxes illustrating steps that are optional in some embodiments. The illustrated and described methods may be utilized to provide the user 102 with a listing of candidate domain names in response to any action described herein that is suitable for prompting the website 106 to present the survey to the user 102. For example, the user 102 may directly request domain name suggestions from the website 106 at step 700.

The survey may be a drill-down survey comprising questions that are arranged within one or more tree structures (herein "trees") across one or more categories. Each question may be a node in the tree that may link to one or more nodes above it (parent nodes) and may be a leaf node (i.e., having no nodes below it) or link to one or more nodes below it (child nodes). The question of each child node may be a more specific question relating to the subject matter of its parent node(s). The user's 102 response to a question may determine which branch (if any) of the tree to follow to the next node. Each node may include one or more tags, such as Microdata or other meta-data tags that help group and analyze information. Data and tags collected from the user's 102 responses may be aggregated, grouped, stored, and analyzed as described below.

A category of the survey may be a particular subject matter to which the questions belonging in the category are directed. Some embodiments may forego categorization of the questions in favor of a single tree of interconnected nodes. Other embodiments may implement "strict" categorization, in which the questions of a category form a tree that does not connect to any nodes of another category's tree. Still other embodiments may implement categorization while still allowing connections between nodes of different categories' trees. A category may pertain to the type of information intended to be collected via the questions of the category. Example categories of this type may include, without limitation: professional information, location information, and social media information. Questions within the category may then drill down to increasing levels of specificity regarding useful information within the category. A question may seek to elicit any element of data related to the user 102 or its business that may inform valuable suggestions of candidate domain names.

In one example, questions in the "professional information" category may identify the type (i.e., industry) of profession (e.g. real estate agency, plumbing, bicycle repair, etc.). This question may be followed by one or more child nodes identifying the specialization(s) within the industry (e.g., for a real estate agency, seller's or buyer's agency or both, local or non-local sales, residential or commercial sales, and the like). One or more subsequent levels of child nodes may further refine the specialization (e.g., for residential sales, selections for luxury, mid-income, or low-income housing, and the like). The user 102 may provide a plurality of responses, such as by selecting a plurality of check-boxes as described below, and any branches to be followed for the selected responses may be processed in any suitable order.

In another example, questions in the "location information" category may identify first a primary location for the user 102. The primary location may be a place of business, area served, city of residence, and the like. This question may be followed by questions in one or more child nodes that identify more and more specifically the user's 102 location or locations. For example, the user 102 may first identify its location as "Phoenix, Ariz.," and if the user 102 desires to further locate itself, the user 102 may select a region of the city (e.g., "east valley," "west valley," "downtown"), a suburban area (e.g., Scottsdale, Tempe, etc.), a neighborhood, and the like, down to one or more specific street addresses. The location selection may be aided by presentation of a map that the user 102 may click on to zoom in and identify a desired point or area to use as a location.

In another example, questions in the "social media information" category may first identify one or more social media networks (e.g., FACEBOOK, YELP, and the like, as described above) on which the user 102 has a profile or account. A subsequent question may request one or more hyperlinks to the user's 102 profile page. Another question subsequent to either of the previous questions may request permission from the user 102 to access the user's 102 third-party accounts and retrieve data as described herein.

Where the drill-down survey includes categories of questions, at step 705 a first survey category may be entered. At step 710, a question at the top-level parent node of the tree (which is the category's tree if categories are used) may be presented to the user 102. The question may be presented in any suitable interface, including any interface described herein for prompting input from the user 102. The question may be presented in any suitable format for obtaining a suitable response in line with the data expected to be obtained from the question. That is, a question may be suitably answered with a yes/no response, a selection from a list of pre-formatted responses, a freeform entry in a text field, and the like. The list of pre-formatted responses may be presented in any suitable format, including drop-down menu, checkbox or radio button list, and the like. A question presented in open-ended style may be displayed with a text box or text area for receiving the response. The text box or text area may have an auto-complete feature to help the user 102 format the response according to a preferred format that may be more easily parsed by the system as described below. The auto-complete feature may limit the user's 102 responses to a set of pre-formatted responses.

In connection with the presentation of the question, a keyword field that may not require completion may be presented in the interface. The user 102 may input into the keyword field any additional words or phrases that the user 102 deems relevant to the response to the question. An instructional text may be presented in the interface for advising the user 102 of suitable words to enter into the keyword field. For example, the interface may present a question for identifying the user's 102 specialization in a previously identified industry, and may advise the user 102 that the name of the user's 102 business may be entered in the keyword field to make the user's 102 response more specific. The keyword field may be used to skip or obviate later questions. For example, a question asking the user 102 to identify the name of the user's 102 business is not needed if the user 102 enters a phrase in the keyword field that can be identified as the business name.

At step 715, the user's 102 response may be collected, parsed, and added to a data "basket" as described below. Where the response is a selection of a pre-formatted response, the data for the response may also be pre-formatted for addition to the data basket, and parsing the response therefore may merely require identifying the proper pre-formatted data associated with the received response. Where the response is an open-ended (i.e., freeform text) response, the response may be parsed into its constituent words and any identifiable relevant phrases, and the parsed words and phrases may be added to the data basket. Adding the data to the data basket may include storing the data in a cache storage database 319 described above with respect to FIG. 3, in another permanent or temporary database, or in a region of temporary memory. In some embodiments, the data associated with the pre-formatted responses may be stored in the cache storage database 319 or a permanent database, and this data may be copied into the data basket with the other data collected in the survey upon receipt of the user's 102 selection of a pre-formatted response.

Parsing the response may include determining if the user 102 added keywords in the keyword field. If so, at step 720 the entered keywords may be added to a keyword basket for processing as described herein with respect to any of FIGS. 2-5, and/or the entered keywords may be added to the data basket together with the user's 102 response. Parsing the response may further include determining whether an external data source (e.g., third party data sources 204, 304, 404, 504 as described above) was identified in the user's 102 response, and whether authorization to access the external data source on behalf of the user 102 was obtained. If so, at step 725 the data source may be accessed and additional useful data scraped from the data source, as described above with respect to step 216 of FIG. 2, step 316 of FIG. 3, step 409 of FIG. 4, step 516 of FIG. 5, or other suitable data scraping approaches. The scraped data may be added to the data basket with the other data collected in the survey.

At any time during the survey process, the user 102 may indicate that enough information has been provided via the drill-down survey and other data collection methods described herein to generate the candidate domain names. Thus, the user 102 may terminate the survey by clicking an appropriate button within the interface. If the user 102 terminates the survey, the generation process moves to step 730. So long as the user 102 does not terminate the survey, questions may be sequentially presented, such as by incrementing a question count, moving down the tree to the next node, and returning to step 710 and proceeding as described above, until a question at a leaf node in the tree has been answered. If survey categories are used, the leaf node reached may merely be the last question in the category, and a category count may be incremented to move to the next category, if any, and the process may continue by returning to step 705 until all categories have been surveyed.

In some embodiments, the data collected during the survey and added to the data basket may include, without limitation, some or all of: words and/or phrases from parsed freeform text responses; data, such as keywords, stored in a database and associated with one or more of the pre-formatted responses selected by the user 102; keywords entered by the user 102 into one or more keyword fields; and data, such as business information and keywords, scraped from one or more data sources. At step 730, the data in the data basket may be used to generate a list of one or more candidate domain names for the user 102. In some embodiments, the data in the basket may be combined into a keyword collection as described above with respect to step 218 of FIG. 2. After the keyword collection has been generated, the system 100 can use that collection of keywords to generate one or more candidate domain names for the user 102 that the user 102 may wish to purchase. In some cases, this will involve analyzing, in addition to the keyword collection, websites of third parties that are relevant to the user or the user's business. In that case, the content of those third party websites can be analyzed to potentially generate additional keywords from which the candidate domain names can be generated or to determine the quality of one or more of the candidate domain names.

Once a candidate domain name, or an alternate domain name as described above, is generated based on the keyword collection at step 730, the system 100 may provide the user 102 an option to add the domain name to their shopping cart at step 735 for purchase. Step 735 may occur, for example, as the user is going through a checkout process for purchase of a client software application.

In various implementations, the method illustrated in FIG. 12 may be continually executed as the user interacts with and utilizes the website builder application (or other software application). As such, the listing of candidate domain names can be continually updated as the user interacts with the software, providing new information and/or revising existing information. As such, while the user utilizes the software application, the listing of candidate domain names will continuously be refreshed and will always represent a list of potential domain names that are closely relevant to the content being supplied by the user into the software application.

Figure 13:
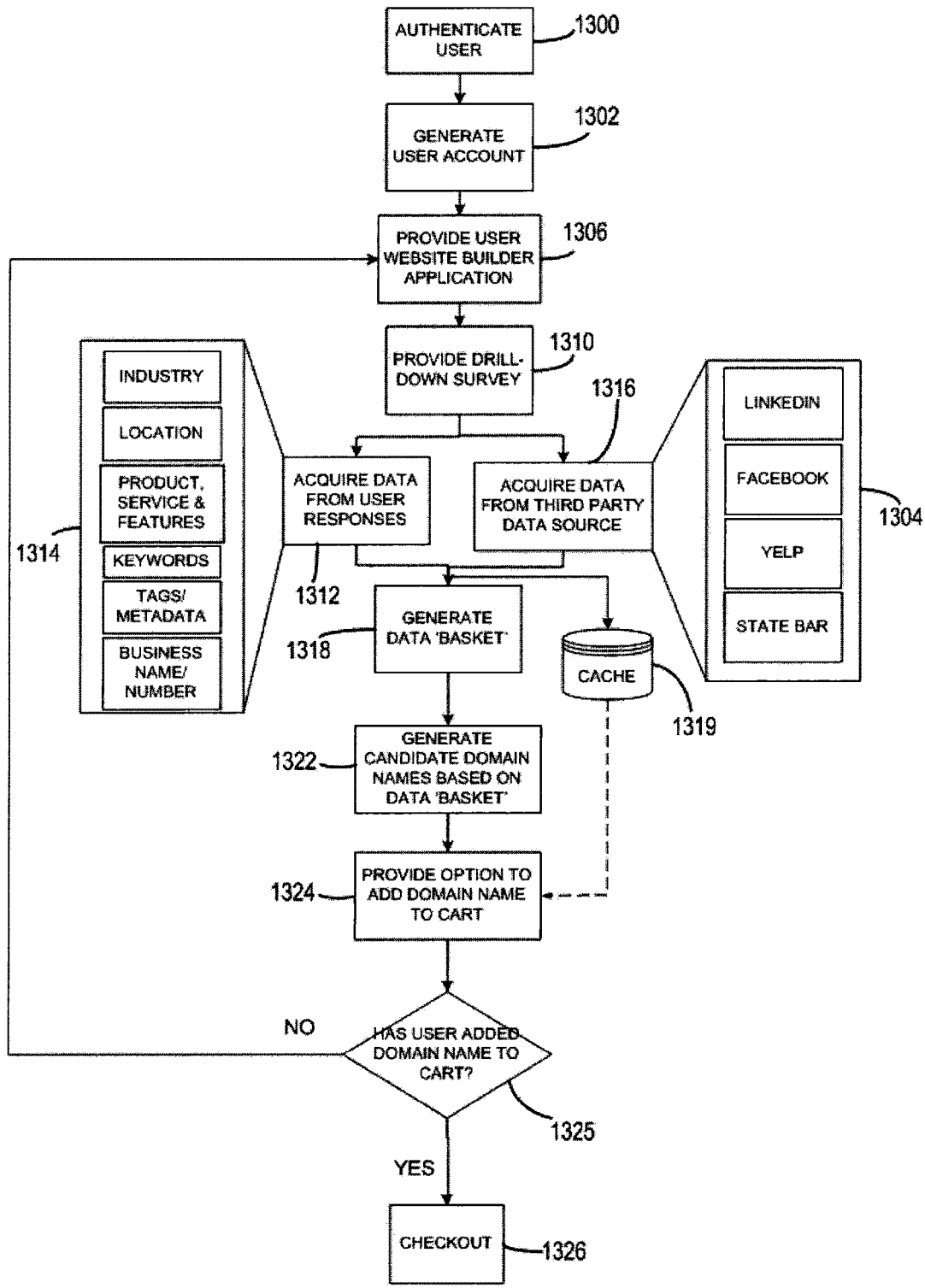
FIG. 13 is a flowchart illustrating a method for generating candidate domain names based on survey data and data related to a website builder application.

Turning now to FIG. 13, a flowchart illustrating a method by which candidate domain names can be generated for the user 102 based on a drill-down survey of the present disclosure taken by the user 102 while utilizing a software application or service, such as a website builder 808, shown in FIG. 8A, is shown. Although the present flowchart and method is described in terms of a user utilizing a specific type of software application (i.e., a website builder), the methods illustrated in FIG. 13 and described herein may be utilized in conjunction with a user utilizing any software application that involves the user supplying information, either explicitly or implicitly, to a software application. For example, the method may be utilized to provide a user with a listing of candidate domain names for purchase while the user is interacting with email software, web hosting management software, accounting software, and the like.

Similarly to the flowchart illustrated in FIG. 3, the user 102 begins by accessing the website 106. In step 1300, the user 102 is authenticated as either an existing user or a new user. If the user 102 is an existing user, the website 106 provides the user 102 access to the website builder application 808 at step 1306 once the user 102 has logged in with their credentials (i.e., username and password). If the user 102 is a new user, a new user account may be generated at step 1302. Once the user account is generated, the website 106 provides the user 102 the website builder application 808 at step 1306.

As a new user, the website builder application 808 will provide the user 102 a plurality of website templates (not shown) to begin building their website. The website templates are pre-designed and may be related to categories such as business and services, music, entertainment, online shop, restaurant and hospitality, photography, design, retail and fashion, personal, etc. Once a template is selected, the user 102 can begin building a website using the website builder application 808 as described above.

At step 1310, before, after, or while the user 102 edits their website using the website builder application 808, a drill-down survey as described above with respect to FIG. 12 may be provided to the user 102 for the user 102 to complete. The user's 102 responses are collected at step 1312 as input data 1314, some or all of which may be added to a data bucket. The system 100 may be configured to acquire additional data about the user 102 or the user's business from third party data sources 1304 at step 1316. For example, if the user 102 provides their first and last name or business name in the survey, the system 100 may run a search on the third party data sources 1304 using the user's 102 first and last name to gather additional information about the user 102. The third party data sources 1304 may include, but are not limited to, LINKEDIN, FACEBOOK, YELP, TWITTER and a State Bar directory. As a non-limiting example, the system 100 may run a search on Facebook.com using the first and last name provided by the user 102. The system 100 may gather information from Facebook.com, such as where the user 102 is from (i.e., city and state), where they are employed, what college they attended, etc.

The system 100 provides an integration module (not shown) to generate a keyword collection at step 1318 by running a content analysis (e.g., crawl) on the website being built by the user 102 that identifies keywords throughout the pages of the website. The keyword collection may contain, for example, keywords related to the user 102 acquired at steps 1312 and 1316, keywords selected from title text on the user's website, and information collected from third party sources about the user or the user's business. A cache storage database 1319 may be provided by the system 100 to store the input data 1314 provided by the user 102 at step 1312 and to store data related to the user 102 acquired from the third party data sources 1304 at step 1316. The keywords generated at step 1318 will be used to generate a candidate domain name for the user 102, as will be discussed in further detail below.

After the collection of keywords has been generated, the system 100 can use that collection of keywords to generate one or more candidate domain names for the user 102 that the user 102 may wish to purchase. In some cases, this will involve analyzing, in addition to the collection of keywords, websites of third parties that are relevant to the user or the user's business. In that case, the content of those third party websites can be analyzed to potentially generate additional keywords from which the candidate domain names can be generated.

In some implementations, the system 100 checks to see if the user already has a registered domain name. If so, the identification of these other domain names can be used to prevent the system 100 from suggesting candidate domain names that are too close to domain names already registered by the user 102.

Once a candidate domain name or an alternate domain name is generated based on the keyword collection at step 1322, the system 100 may provide the user 102 an option to add the domain name to their shopping cart at step 1324 for purchase as part of the website builder interface. At step 1325, the user 102 may choose to add the candidate domain name to their shopping cart. At step 1326, the user 102 may select a 'checkout' button to complete their purchase of the website builder application 808 and, optionally, the domain name generated at step 1322. As indicated by step 1325, if the user 102 does not elect to purchase one of the candidate domain names, the method may repeat and the system 100 continues providing the website builder application 808 to the user. As such, additional revisions or changes to the user's website can be captured, in which case a new listing of candidate domain names may be generated and displayed for purchase by the user 102. Accordingly, if the user 102 does not elect to purchase one of the candidate domain names, the system 100 returns to step 1306 to again provide the website builder application to the user and monitor whether the user 102 is updating or adding data 1314 to their website. During this process, the system 100 provides the cache storage 1319 in order to store the recently updated and added data 1314, as well as the data acquired from third party data sources 1304. In this sense, the system 100 may access the cache storage 1319 to quickly generate either the candidate or alternate domain name at step 1322 and provide the user 102 the option to add the domain name to their shopping cart at step 1324.

In various implementations, the method illustrated in FIG. 13 may be continually executed as the user interacts with and utilizes the website builder application (or other software application). As such, the listing of candidate domain names can be continually updated as the user interacts with the software, providing new information and/or revising existing information. As such, while the user utilizes the software application, the listing of candidate domain names will continuously be refreshed and will always represent a list of potential domain names that are closely relevant to the content being supplied by the user into the software application.

Figure 14:
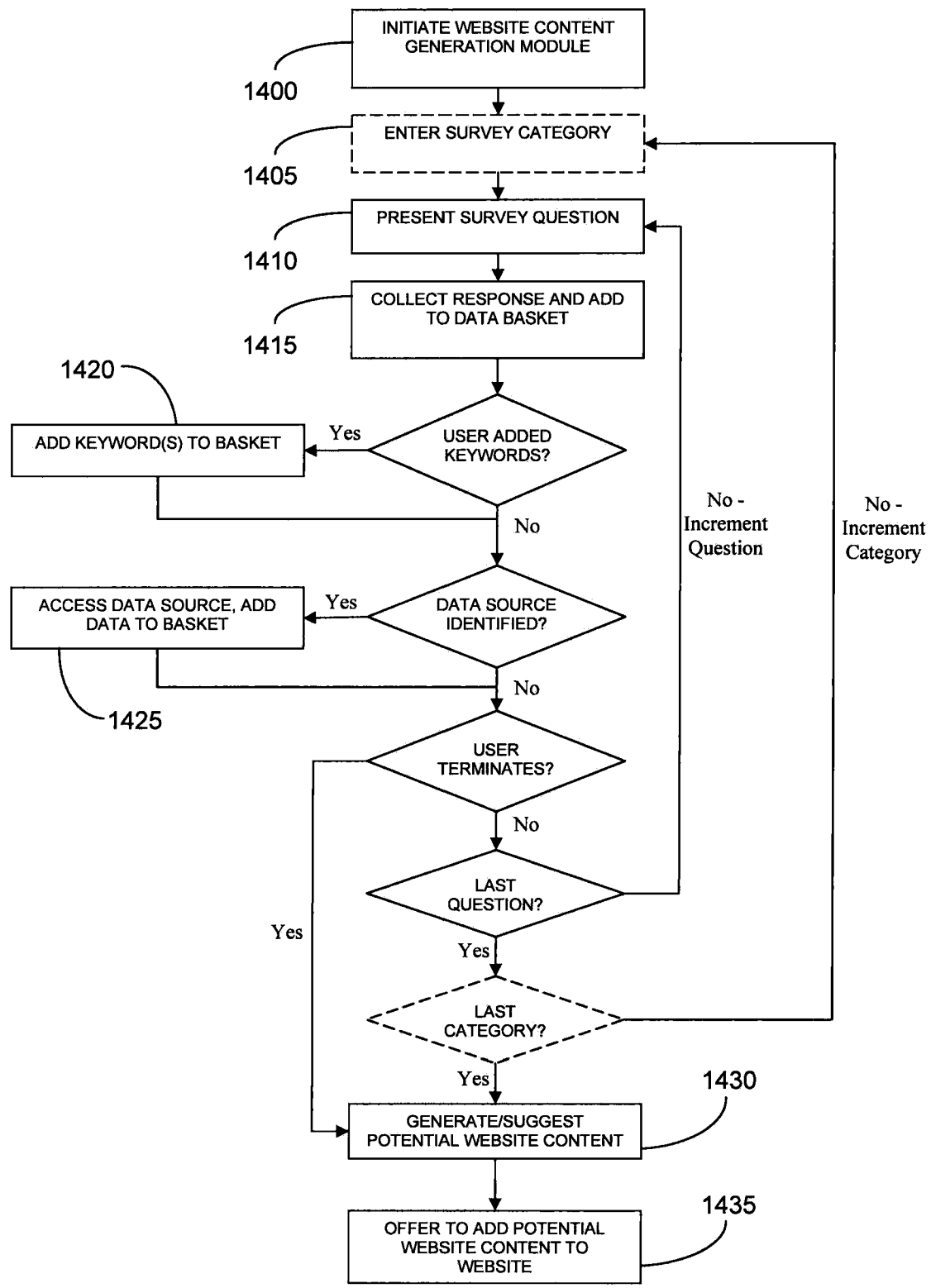
FIG. 14 is a flowchart illustrating a method for suggesting potential website content using a drill-down survey.

In another embodiment of the described system and methods, which may be implemented in conjunction with or alternatively to any of the embodiments described above, the drill-down survey may be used to suggest potential website content for the user's website. Referring to FIG. 14, a flowchart illustrating a method by which potential website content may be generated for or suggested to the user 102 based on survey question responses is shown, with dashed boxes illustrating steps that are optional in some embodiments. The illustrated and described methods may be utilized to provide the user 102 with suggestions for potential website content in response to any action described herein that is suitable for prompting the website 106 to initiate the website content generation module 1400 and present the survey to the user 102. For example, the user 102 may directly request potential website content suggestions from the website 106, or the user's interaction with a website builder application may trigger initiation of the content generation module.

The survey may be a drill-down survey as described above with respect to FIG. 12. Thus, where the drill-down survey includes categories of questions, at step 1405 a first survey category may be entered. At step 1410, a question at the top-level parent node of the tree (which is the category's tree if categories are used) may be presented to the user 102 as described in step 710 of FIG. 12. In connection with the presentation of the question, a keyword field that may not require completion may be presented in the interface with instructional text for advising the user 102 of suitable words to enter into the keyword field.

At step 1415, the user's 102 response may be collected, parsed, and added to a data "basket" as described above. Parsing the response may include determining if the user 102 added keywords in the keyword field. If so, at step 1420 the entered keywords may be added to the data basket together with the user's 102 response. Parsing the response may further include determining whether an external data source (e.g., third party data sources 204, 304, 404, 504, 1304 as described above) was identified in the user's 102 response, and whether authorization to access the external data source on behalf of the user 102 was obtained. If so, at step 1425 the data source may be accessed and additional useful data scraped from the data source, as described above with respect to step 216 of FIG. 2, step 316 of FIG. 3, step 409 of FIG. 4, step 516 of FIG. 5, or other suitable data scraping approaches. The scraped data may be added to the data basket with the other data collected in the survey.

At any time during the survey process, the user 102 may indicate that enough information has been provided via the drill-down survey and other data collection methods described herein to suggest the potential website content. Thus, the user 102 may terminate the survey and the generation/suggestion process moves to step 1430. So long as the user 102 does not terminate the survey, questions may be sequentially presented, such as by incrementing a question count, moving down the tree to the next node, and returning to step 1410 and proceeding as described above, until a question at a leaf node in the tree has been answered. If survey categories are used, the leaf node reached may merely be the last question in the category, and a category count may be incremented to move to the next category, if any, and the process may continue by returning to step 1405 until all categories have been surveyed.

In some embodiments, the data collected during the survey and added to the data basket may include, without limitation, some or all of: words and/or phrases from parsed freeform text responses; data, such as keywords, stored in a database and associated with one or more of the pre-formatted responses selected by the user 102; keywords entered by the user 102 into one or more keyword fields; and data, such as business information and keywords, scraped from one or more data sources. At step 1430, the data in the data basket may be used to suggest potential website content that the user 102 may wish to include on a website. In some embodiments, the data in the basket may be combined into a keyword collection as described above with respect to step 218 of FIG. 2. After the keyword collection has been generated, the system 100 can use that keyword collection to derive information about the website, such as: whether the website is for an individual or a business; the field or industry in which the user participates; the types of goods or services offered by the user; location(s) of the user's offices or facilities; hours of operation; price lists; and other information the user may wish to include on the website. The system 100 may use the derived information to suggest one or more website content elements, including website structure (e.g., suitable templated layouts, pages and page titles to include, intrasite links, and the like) and formatted content (e.g., hours of operation, price lists, location and contact information, etc.). Suggesting the content may include generating the content to display it to the user, either during the suggestion step 1430 or after the user 102 has selected suggested content for inclusion in the website. Suggesting and generation website content may include analyzing, in addition to the keyword collection, websites of third parties that are relevant to the user or the user's business. In that case, the content of those third party websites can be analyzed to potentially generate additional keywords from which the suggested content can be generated or to determine the quality of one or more of the elements of suggested content.

At step 1435, the system 100 may provide the user 102 an option to select suggested content for inclusion in the website. Step 1435 may occur, for example, as the user is going through a checkout process for purchase of a client software application.

In various implementations, the method illustrated in FIG. 14 may be continually executed as the user interacts with and utilizes the website builder application (or other software application). As such, the suggestions for potential website content can be continually updated as the user interacts with the software, providing new information and/or revising existing information. As such, while the user utilizes the software application, the suggestions for potential website content will continuously be refreshed and will always represent potential website content that is closely relevant to the content and survey responses being supplied by the user into the software application.

Figure 15:
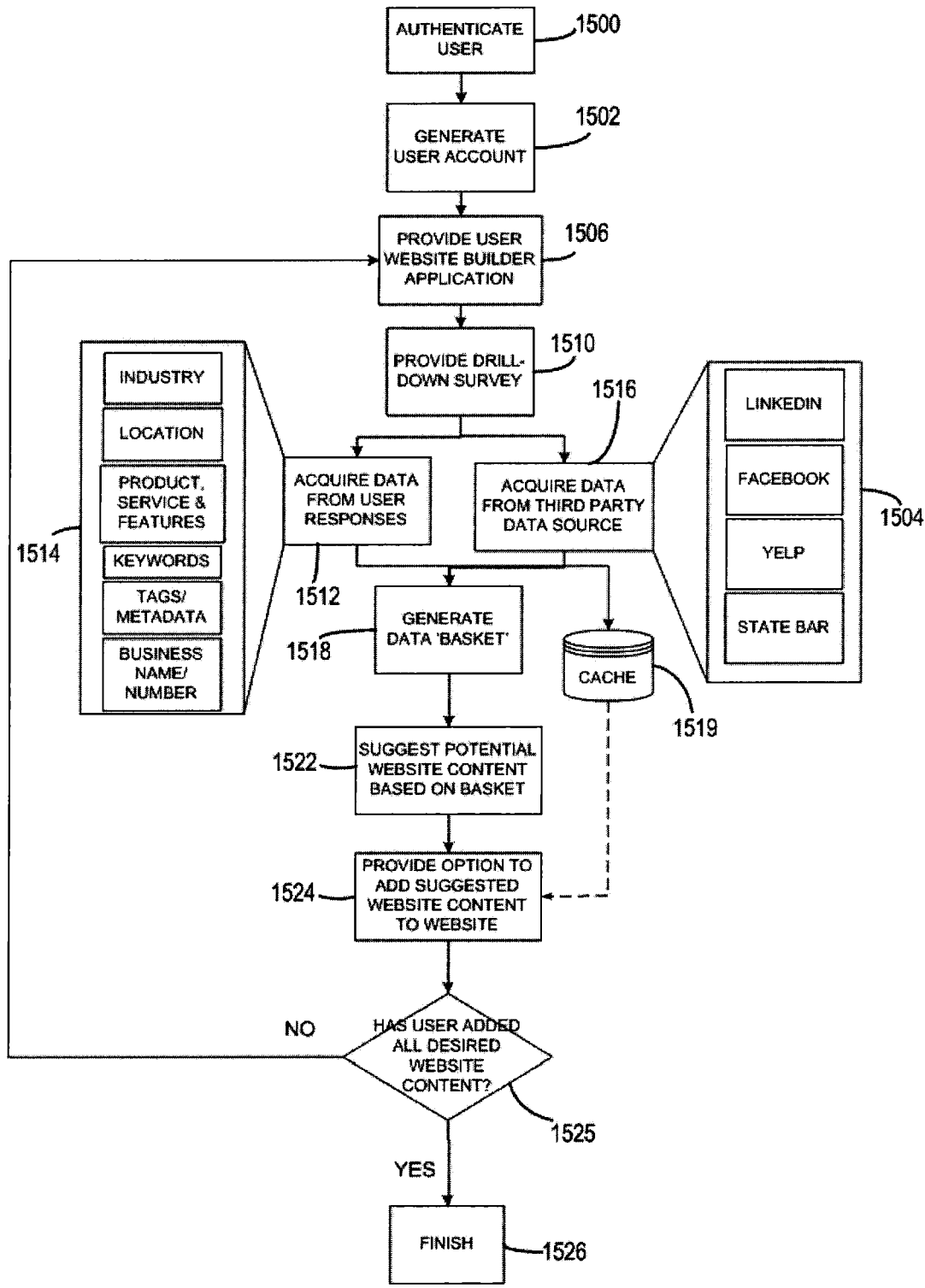
FIG. 15 is a flowchart illustrating a method for suggesting potential website content based on survey data and data related to a website builder application.

Turning now to FIG. 15, a flowchart illustrating a method by which potential website content can be generated/suggested for the user 102 based on a drill-down survey of the present disclosure taken by the user 102 while utilizing a software application or service, such as a website builder 808, shown in FIG. 8A, is shown. Although the present flowchart and method is described in terms of a user utilizing a specific type of software application (i.e., a website builder), the methods illustrated in FIG. 15 and described herein may be utilized in conjunction with a user utilizing any software application that involves the user supplying information, either explicitly or implicitly, to a software application. For example, the method may be utilized to provide a user with suggestions for website content while the user is interacting with email software, web hosting management software, accounting software, and the like.

Similarly to the flowchart illustrated in FIG. 13, the user 102 begins by accessing the website 106. In step 1500, the user 102 is authenticated as either an existing user or a new user. If the user 102 is an existing user, the website 106 provides the user 102 access to the website builder application 808 at step 1506 once the user 102 has logged in with their credentials (i.e., username and password). If the user 102 is a new user, a new user account may be generated at step 1502. Once the user account is generated, the website 106 provides the user 102 the website builder application 808 at step 1506.

At step 1510, before, after, or while the user 102 edits their website using the website builder application 808, a drill-down survey as described above with respect to FIG. 12 may be provided to the user 102 for the user 102 to complete. The user's 102 responses are collected at step 1512 as input data 1514, some or all of which may be added to a data bucket. The system 100 may be configured to acquire additional data about the user 102 or the user's business from third party data sources 1504 at step 1516. For example, if the user 102 provides their first and last name or business name in the survey, the system 100 may run a search on the third party data sources 1504 using the user's 102 first and last name to gather additional information about the user 102. The third party data sources 1504 may include, but are not limited to, LINKEDIN, FACEBOOK, YELP, TWITTER and a State Bar directory. As a non-limiting example, the system 100 may run a search on Facebook.com using the first and last name provided by the user 102. The system 100 may gather information from Facebook.com, such as where the user 102 is from (i.e., city and state), where they are employed, what college they attended, etc.

The system 100 provides an integration module (not shown) to generate a keyword collection at step 1518 by running a content analysis (e.g., crawl) on the website being built by the user 102 that identifies keywords throughout the pages of the website. The keyword collection may contain, for example, keywords related to the user 102 acquired at steps 1512 and 1516, keywords selected from title text on the user's website, and information collected from third party sources about the user or the user's business. A cache storage database 1519 may be provided by the system 100 to store the input data 1514 provided by the user 102 at step 1512 and to store data related to the user 102 acquired from the third party data sources 1504 at step 1516. The keywords generated at step 1518 will be used to generate the suggestions for potential website content.

After the keyword collection has been generated, the system 100 can use that keyword collection to suggest one or more elements of potential website content for the user 102, as described above with respect to FIG. 14. In some cases, this will involve analyzing, in addition to the collection of keywords, websites of third parties that are relevant to the user or the user's business. In that case, the content of those third party websites can be analyzed to potentially generate additional keywords from which the content suggestions can be generated.

Once potential website content is suggested based on the keyword collection at step 1522, the system 100 may provide the user 102 an option to add the suggested website content to the website at step 1524 as part of the website builder interface. At step 1525, the user 102 may choose to add the suggested website content to the website. At step 1526, the process may terminate if the user has finished adding content to the website. As indicated by step 1525, if the user 102 is not finished adding content, the method may repeat and the system 100 continues providing the website builder application 808 to the user. The system 100 returns to step 1506 to again provide the website builder application to the user and monitor whether the user 102 is updating or adding data 1514 to their website. During this process, the system 100 provides the cache storage 1519 in order to store the recently updated and added data 1514, as well as the data acquired from third party data sources 1504. In this sense, the system 100 may access the cache storage 1519 to quickly generate new suggestions for potential website content.

In various implementations, the method illustrated in FIG. 15 may be continually executed as the user interacts with and utilizes the website builder application (or other software application). As such, the suggestions for website content can be continually updated as the user interacts with the software, providing new information and/or revising existing information. As such, while the user utilizes the software application, the suggestions will continuously be refreshed and will always suggest content that is closely relevant to the content being supplied by the user into the software application.

The questions for the drill-down survey described above with respect to FIGS. 12-15 may be developed from a corpus of information related to some or all of the websites on the internet. Thus, the survey may be offered in a website builder application that is used by, potentially, millions of users to generate websites. Before the survey is first offered to a user, the corpus may contain publicly accessible information, such as trade classifications (e.g., the North American Industry Classification System), conceptual ontologies such as Freebase, and other data aggregation and classification sources. The corpus may additionally or alternatively contain human-generated information, such as results from editorial refinement of existing website classifications. As survey data is collected from users, some or all of the collected data may be added to the corpus to expand and refine the drill-down survey. Data in the corpus may be tagged as described above, allowing the system 100 to recognize and group common answers (e.g., dentists and doctors may have similar responses to questions). Questions may be arranged in the tree(s) automatically through the recognition of patterns in the data. For example, the system 100 may recognize that certain keywords are associated with particular industries, either by their context or by the volume of survey responses that tag them as such. The trees may further be arranged by a system administrator when advantageous, or when there is insufficient information for the system 100 to automatically organize the questions.

Figure 16:
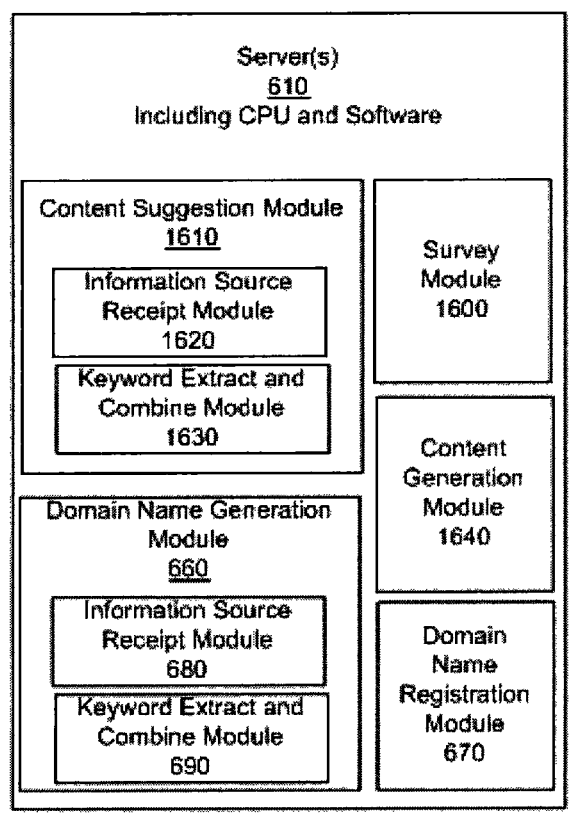
FIG. 16 illustrates another possible embodiment of a server as in FIG. 7.

FIG. 16 illustrates another embodiment of the server 610 illustrated in FIG. 7. The system 100 may further comprise a survey module 1600 that that may be stored in the memory of—and run on—at least one server 610 and may comprise any software and/or scripts containing instructions that, when executed by the server's 610 microprocessor, cause the microprocessor to present the drill-down survey questions, collect responses, and manage the corpus of information and survey questions derived therefrom.

The system 100 may also comprise a content suggestion module 1610 that may be stored in the memory of—and run on—at least one server 610 and may comprise any software and/or scripts containing instructions that, when executed by the server's 610 microprocessor, cause the microprocessor to suggest potential website content relevant to the keyword collection. The content suggestion module 1610 may comprise an information source receipt module 1620 that operates similarly to the information source receipt module 680 of the domain name generation module 660, and a keyword extraction and combination module 1630 that operates similarly to the keyword extraction and combination module 690 of the domain name generation module 660. Alternatively, the discrete information source receipt modules 680, 1620 may be combined and the discrete keyword extraction and combination modules 690, 1630 may be combined into single modules to perform the tasks for both the domain name generation module 660 and the content suggestion module 1610.

The system 100 may also comprise a content generation module 1640 that may be stored in the memory of—and run on—at least one server 610 and may comprise any software and/or scripts containing instructions that, when executed by the server's 610 microprocessor, cause the microprocessor to generate the potential website content that is suggested by the server 610 before or after the suggested content is selected by the user 102. The content generation module 1640 may be integral with, an extension of, or remote from other content generation modules for generating website content, such as any modules that operate the website builder application 808.

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

The invention claimed is:

1. A method, comprising:
    presenting, to a user by at least one server communicatively coupled to a network, a drill-down survey comprising one or more questions wherein each of the questions corresponds to a node in a tree structure, wherein the tree structure comprises parent nodes and child nodes of the parent nodes, and wherein each question corresponding to one of the child nodes is more specific than the question corresponding to each of that child node's parent nodes;

parsing, by the at least one server, responses to the questions from the user into a first plurality of keywords associated with at least one of the user, a website of the user, and a business of the user;

determining, by the at least one server from one or more of the responses, a third party data source identified by the user, the third party data source being remote from the at least one server and accessible by the at least one server via the network;

receiving, by the at least one server from the user, an authorization for the at least one server to access the third party data source using a third party account of the user;

obtaining, by the at least one server, additional data about the user from the third party data source, the additional data being obtainable from the third party data source only using the third party account;

parsing, by the at least one server, the additional data about the user from the third party data source into a second plurality of keywords;

generating, by the at least one server, a keyword basket comprising the first plurality of keywords and the second plurality of keywords;

generating, by the at least one server, a candidate domain name relevant to the first plurality of keywords and to the additional data by combining keywords in the keyword basket into a root name of the candidate domain name; and displaying, to the user by the at least one server, a user interface including the candidate domain name, the user interface enabling the user to register the candidate domain name.

2. The method of claim 1, wherein the user interface is displayed within a software application.

3. The method of claim 2, wherein the software application includes a website builder application, a website hosting application, an advertising application, a storage application, or an email application.

4. The method of claim 1, wherein the additional data comprises information associated with at least one of the user, a website of the user, and a business of the user.

5. The method of claim 1, wherein one or more of the questions is an open-ended question.

6. The method of claim 5, wherein presenting the drill-down survey comprises displaying one of a text box and a text area in which the user enters the response to the open-ended question.

7. The method of claim 5, wherein one or more of the questions has a plurality of pre-formatted responses.

8. The method of claim 5, further comprising:
generating, by the at least one server, a suggestion for potential website content to be included on a website of the user, the potential website content being relevant to the keywords; and
displaying the suggestion in the user interface.

9. The method of claim 5, further comprising generating one or more of the questions for the drill-down survey from a corpus of information.

10. The method of claim 9, wherein the corpus of information comprises data obtained from a source of publicly available data.

11. A system, comprising:
at least one server computer in communication with a network, the at least one server computer including a processor configured to:
present, to a user of the network, a drill-down survey comprising one or more questions wherein the questions are arranged into one or more tree structures and each of the questions corresponds to a node in one of the one or more tree structures, wherein each of the one or more tree structures comprises parent nodes and child nodes of the parent nodes, and wherein each question corresponding to one of the child nodes is more specific than the question corresponding to each of that child node's parent nodes;
parse responses of the user to the questions into a first plurality of keywords associated with at least one of the user, a website of the user, and a business of the user;
determine, from one or more of the responses, a third party data source identified by the user, the third party data source being remote from the at least one server computer and accessible by the at least one server computer via the network;
receive from the user an authorization for the at least one server computer to access the third party data source using a third party account of the user;
obtain additional data about the user from the third party data source, the additional data being obtainable using the third party account;
parse the additional data about the user from the third party data source into a second plurality of keywords;
generate a keyword basket comprising the first plurality of keywords and the second plurality of keywords; and
generate at least one of a candidate domain name relevant to the first plurality of keywords and to the additional data by combining keywords in the keyword basket into a root name of the candidate domain name, and a suggestion for potential website content relevant to the keywords and to the additional data.

12. The system of claim 11, wherein one of the questions comprises a request for the user to authorize the processor to access the third party data source.

13. The system of claim 11, further comprising a database storing a corpus of information, the processor being further configured to access the database and generate one or more of the questions from the corpus of information.

14. The system of claim 11, further comprising a database storing the questions in the one or more tree structures.

15. A method, comprising:
receiving, from a user by at least one server computer communicatively coupled to a network, a first plurality of keywords from responses to one or more questions wherein the questions are arranged into one or more tree structures and each of the questions corresponds to a node in one of the one or more tree structures, wherein each of the one or more tree structures comprises parent nodes and child nodes of the parent nodes, and wherein each question corresponding to one of the child nodes is more specific than the question corresponding to each of that child node's parent nodes;
determining, by the at least one server computer, a third party data source identified by the user, the third party data source being remote from the at least one server computer and accessible by the at least one server computer via the network;

receiving, by the at least one server computer from the user, an authorization for the at least one server computer to access the third party data source using a third party account of the user;

obtaining, by the at least one server computer, additional data about the user from the third party data source, the additional data being obtainable using the third party account;

parsing, by the at least one server computer, the additional data about the user from the third party data source into a second plurality of keywords;

generating, by the at least one server computer, a keyword basket comprising the first plurality of keywords and the second plurality of keywords;

generating, by the at least one server computer, candidate domain names relevant to the first plurality of keywords and to the additional data by combining keywords in the keyword basket into a root name of the candidate domain name; and displaying, to the user by the at least one server computer, a user interface including one or more of the candidate domain names, the user interface enabling the user to register one or more of the candidate domain names.

16. The method of claim 15, wherein the one or more keywords include a name of a business of the user and one or both of an industry and a vertical market of the business.

17. A method, comprising:

presenting, to a user by at least one server communicatively coupled to a network, one or more questions wherein the questions are arranged into one or more tree structures and each of the questions corresponds to a node in one of the one or more tree structures, wherein each of the one or more tree structures comprises parent nodes and child nodes of the parent nodes, and wherein each question corresponding to one of the child nodes is more specific than the question corresponding to each of that child node's parent nodes;

receiving, by the at least one server, responses to the one or more questions from the user;

parsing, by the at least one server, the responses to the questions from the user into a first plurality of keywords associated with the user;

determining, by the at least one server from one or more of the responses, a third party data source identified by the user, the third party data source being remote from the at least one server and accessible by the at least one server via the network;

receiving, by the at least one server from the user, an authorization for the at least one server to access the third party data source using a third party account of the user;

obtaining, by the at least one server, additional data about the user from the third party data source, the additional data being obtainable using the third party account;

parsing, by the at least one server, the additional data about the user from the third party data source into a second plurality of keywords;

generating a keyword basket comprising the first plurality of keywords and the second plurality of keywords;

generating, by the at least one server, a candidate domain name relevant to the responses to the one or more questions by combining keywords in the keyword basket into a root name of the candidate domain name; and displaying, to the user by the at least one server, a user interface including the candidate domain name, the user interface enabling the user to register the candidate domain name.

18. The method of claim 17, wherein the responses to the one or more questions include a name of a business of the user and one or both of an industry and a vertical market of the business.

* * * * *